US008422608B2

(12) United States Patent
Hamamoto

(10) Patent No.: US 8,422,608 B2
(45) Date of Patent: *Apr. 16, 2013

(54) WIRELESS RECEIVER

(75) Inventor: Yasuo Hamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,950

(22) Filed: Sep. 12, 2012

(65) Prior Publication Data

US 2013/0003866 A1   Jan. 3, 2013

Related U.S. Application Data

(63) Continuation of application No. 12/920,201, filed as application No. PCT/JP2009/003701 on Aug. 4, 2009, now Pat. No. 8,290,101.

(30) Foreign Application Priority Data

Aug. 6, 2008   (JP) ................................. 2008-202811

(51) Int. Cl.
 *H04B 7/10* (2006.01)
(52) U.S. Cl.
 USPC ........... 375/347; 375/260; 375/267; 375/340; 375/342; 375/346; 375/349; 375/350; 455/101; 455/132; 455/296; 455/500; 455/501; 455/562.1; 370/210; 370/334; 370/335; 370/342; 370/480; 341/173; 341/180; 327/551
(58) Field of Classification Search .................. 375/260, 375/267, 340, 342, 346, 349, 350; 455/101, 455/132, 296, 500, 501, 562.1; 370/210, 370/334, 335, 342, 480; 341/173, 180; 327/551
See application file for complete search history.

(56) References Cited

U.S. PATENT DOCUMENTS

2003/0210749 A1   11/2003   Asjadi
2004/0185815 A1   9/2004    Fukuda et al.
(Continued)

FOREIGN PATENT DOCUMENTS

JP   2002-044051 A   2/2002
JP   2004-260428 A   9/2004
(Continued)

OTHER PUBLICATIONS

Shuya Hosokawa et al. "A Study on Interference Suppression for Wireless OFDM Signals", Proceedings of the Society Conference of IEICE (The Institute of Electronics, Information and Communication Engineers of Japan), B-5-189, Sep. 7, 2005 (B-5 Wireless Communications System B (Wireless Access), Communication [1]) (Paper).

(Continued)

*Primary Examiner* — Leon Flores
(74) *Attorney, Agent, or Firm* — RatnerPrestia

(57) ABSTRACT

A wireless receiver including receiving antennas, frequency-space transformers, noise wave removers, a back-end signal processor, a pattern detector, a broadcast interruption detector, and a back-end controller. The frequency-space transformers convert signals received by the antennas into frequency-space signals. The noise wave removers each at least perform the calculation of a transmission line coefficient matrix and the calculation of an inter-antenna covariance matrix on the frequency-space signals. A controller controls the back-end signal processor to operate when the multicarrier transmission waves have been detected to be interrupted. The noise wave removers each perform the calculation of the inter-antenna covariance matrix when a broadcast interruption detector has detected the interruption of the multicarrier airwaves. Thus, the wireless receiver removes noise generated within it, thereby having high reception sensitivity.

22 Claims, 17 Drawing Sheets

U.S. PATENT DOCUMENTS

| | | |
|---|---|---|
| 2005/0237918 A1 | 10/2005 | Asai et al. |
| 2006/0221808 A1 | 10/2006 | Shirakata et al. |
| 2006/0293006 A1 | 12/2006 | Taniguchi et al. |
| 2007/0230604 A1 | 10/2007 | Nakamura |
| 2007/0259623 A1 | 11/2007 | Tanaka et al. |
| 2009/0086841 A1 | 4/2009 | Guo et al. |

FOREIGN PATENT DOCUMENTS

| | | |
|---|---|---|
| JP | 2008-245000 A | 10/2008 |
| WO | WO 2006/003776 | 1/2006 |

OTHER PUBLICATIONS

Shuya Hosokawa et al. "A Study on Interference Suppression for Wireless OFDM Signals", Proceedings of the Society Conference of IEICE (The Institute of Electronics, Information and Communication Engineers of Japan), B-5-189, Sep. 23, 2005 (B-5 Wireless Communications System B (Wireless Access), Communication [1]) (Power Point Presentation).

International Search Report for Interantional Application No. PCT/JP20009/003701, Sep. 29, 2009, Panasonic Corporation.

WIRELESS RECEIVER

This application is a continuation of U.S. patent application Ser. No. 12/920,201, filed Aug. 30, 2010, which is a U.S. National Phase Application of PCT International Application PCT/JP2009/003701, filed Aug. 4, 2009, the entire disclosures of which are incorporated herein by reference.

TECHNICAL FIELD

The present invention relates to wireless receivers for receiving wireless communications, and more particularly, to a wireless receiver which receives signals through its plurality of antennas from a wireless transmission station.

BACKGROUND ART

According to conventional wireless reception technology, spatially multiplexed signals transmitted by multiple antennas are received by multiple receiving antennas in such a manner as to achieve high-speed transmission and stable reception using channel estimation techniques. This system is called "MIMO" (Multi Input Multi Out). An example of the conventional wireless reception technology is disclosed in Patent Literature 1.

FIG. 17 shows a conventional wireless transmitter and a conventional wireless receiver disclosed in Patent Literature 1. In FIG. 17, the wireless transmitter includes signal input terminal 800, space-time encoders 801 and 802, inverse fast Fourier transformers 803, 804, 805, and 806, and transmitting antennas 807, 808, 809, and 810. Space-time encoders 801 and 802 are respectively shown as "STE1" and "STE2" in FIG. 17. Inverse fast Fourier transformers 803, 804, 805, and 806 are respectively shown as "IFFT1", "IFFT2", "IFFT3", and "IFFT4" in FIG. 17. Transmitting antennas 807, 808, 809, and 810 are respectively shown as "TA1", "TA2", "TA3", and "TA4" in FIG. 17.

The wireless receiver includes receiving antennas 811, 812, and 813, fast Fourier transform subsystems 814, 815, and 816, space-time processor 817, space-time decoders 818 and 819, channel parameter estimator 820, and output terminals 821 and 822. Receiving antennas 811, 812, and 813 are respectively shown as "RA1", "RA2", and "RAp" in FIG. 17. Fast Fourier transform subsystems 814, 815, and 816 are respectively shown as "FFT1", "FFT2", and "FFTp" in FIG. 17. Space-time processor 817 is shown as "STP" in FIG. 17. Space-time decoders 818 and 819 are respectively shown as "STD1" and "STD2" in FIG. 17. Channel parameter estimator 820 is shown as "CPE" in FIG. 17.

In the wireless transmitter, input terminal 800 receives a data block, which is separated into a data block b1 [n, k] and a data block b2 [n, k]. The data blocks b1 [n, k] and b2 [n, k] are respectively supplied to space-time encoders 801 and 802. Space-time encoders 801 and 802 each generate two data pairs. More specifically, the data blocks b1 [n, k] and b2 [n, k] are converted into a total of four pieces of data (tm1 [n, k] to tm4 [n, k]). Inverse fast Fourier transformers 803 to 806 modulate the converted four pieces of data (tm1 [n, k] to tm4 [n, k]), and then output OFDM signals. Transmitting antennas 807 to 810 wireless-transmit the OFDM signals. The OFDM signals thus transmitted are received by receiving antennas 811 to 813. As shown in FIG. 17, the OFDM signals transmitted by transmitting antennas 807 to 810 are received in a state of overlapping each other by receiving antennas 811 to 813.

Fast Fourier transform subsystem 814 converts a signal r1 [n, k] received by receiving antenna 811 into a frequency-space signal and supplies it to space-time processor 817. Fast Fourier transform subsystem 815 converts a signal r2 [n, k] received by antenna 812 into a frequency-space signal and supplies it to space-time processor 817. Similarly, fast Fourier transform subsystem 816 converts a signal rp [n, k] received by antenna 813 into a frequency-space signal and supplies it to space-time processor 817. Channel parameter estimator 820 receives the signals converted by fast Fourier transform subsystems 814 to 816 and determines channel parameter information from the signals.

Then, channel parameter estimator 820 supplies the determined results to space-time decoders 818 and 819, so that the determined results are used for decoding. The spatially multiplexed transmission signals are separated and decoded by space-time processor 817, space-time decoders 818 and 819, and channel parameter information, and then are supplied to output terminals 821 and 822.

As an application of the spatial multiplexing demodulation technique shown in Patent Literature 1, interference suppression reception technology published by the IEICE in 2005 is shown in Non-Patent Literature 1. FIG. 18 shows a wireless transmitter and a wireless receiver disclosed in Non-Patent Literature 1.

In FIG. 18, wireless transmitter 500 includes communication controller 501, first and second IFFTs 502 and 504, and transmitting antennas 503 and 505. Its principle and operation are the same as those of the wireless transmitter of Patent Literature 1. FIG. 18 shows, for simplification, two transmitting antennas transmitting two OFDM data streams. The wireless receiver includes receiving antennas 601 and 603, first and second FFTs 602 and 604, demapper 611, Viterbi decoder 612, and interference suppressors 600. Interference suppressors 600 each include weighting/combining unit 605, transmission line estimator 606, undesired signal measurer 607, and reliability evaluator 610.

In FIG. 18, interfering station 700 transmits radio interference waves which interfere with radio waves transmitted by wireless transmitter 500 while they are passing through fading channel 900.

In the wireless receiver, receiving antennas 601 and 603 receive the OFDM signals with which the above-mentioned radio interference waves have interfered. First and second FFTs 602 and 604 fast Fourier transform the received OFDM signals and output the resulting signals on a per-OFDM-subcarrier basis. Interference suppressors 600, which are as many as the number of subcarriers, perform demodulation of the signals received from wireless transmitter 500, and at the same time, removal of the disturbing waves. In each interference suppressor 600, transmission line estimator 606 calculates a transmission line coefficient matrix "H", which indicates the state of transmission in fading channel 900 by using the preamble of a packet. The transmission line coefficient matrix "H" is calculated by the same formula as for a normal MIMO demodulation operation. Undesired signal measurer 607 detects an interference wave signal during the time after a desired wave packet is transmitted and until the next desired wave packet is transmitted, and then calculates an inter-antenna covariance matrix Ruu.

Weighting/combining unit 605 first calculates a weighting coefficient W with which the input signals at receiving antenna 601 and 603 are combined, by using the inter-antenna covariance matrix Ruu. The inter-antenna covariance matrix Ruu is calculated on the basis of each subcarrier component of the OFDM signals and the transmission line coefficient matrix "H". Weighting/combining unit 605 then performs a weighting and combining operation on a reception signal vector "r" using the weighting coefficient W, thereby calculating a signal vector "s", which is obtained by W*r. The reception signal vector "r" is obtained from the input signals at receiving antennas 601 and 603. This calculation allows the demodulation to be performed with suppressed interference waves. When no interference wave exists, the inter-antenna covariance matrix Ruu contains only noise components of the interference waves. As a result, the inter-antenna covariance matrix Ruu becomes equivalent to the reception using maximum ratio combining, thus adaptively reducing reception errors all the time.

FIG. 19A shows the relation between OFDM subcarrier 701 and noise component 702 before the input signals at receiving antenna 601 and 603 are weighted and combined by weighting/combining unit 605. FIG. 19b shows OFDM subcarrier 703 and residual error 704 after the input signals are weighted and combined by weighting/combining unit 605, and then each subcarrier amplitude is normalized. From the results, it is likely that the interference wave signals remaining after noise removal are different from subcarrier to subcarrier, and that the larger the residual error, the less reliable the subcarrier. For this reason, reliability evaluator 610 calculates, as a likelihood "K" indicating the likelihood of the signal, the reciprocal of a residual error "e" (a remaining interference wave signal) at the time point when each subcarrier amplitude is normalized after the weighting and combining.

Demapper 611 restores the mapping of the per-subcarrier signals outputted from interference suppressors 600. Viterbi decoder 612 performs error correction on the signals having the restored mapping, using the likelihood "κ", and outputs demodulated signals.

FIG. 20 shows simulation results indicating that the SIR (signal to interference ratio) required to obtain the same PER (packet error rate) can be improved by about 10 dB+5 dB by performing two processes. The two processes are interference suppression by weighting and combining, and Viterbi decoding using likelihood. In FIG. 20, the horizontal and vertical axes represent the required SIR and the PER, respectively. As shown in FIG. 20, weighting and combining effect 212 is about 10 dB, and Viterbi likelihood effect 211 is about 5 dB.

In the conventional wireless receiver, however, the channel estimation of a desired wave uses the preamble of the desired wave packet. Therefore, it is impossible to perform the channel estimation of a continuous wave with no preamble.

CITATION LIST

Patent Literature 1: Japanese Patent Unexamined Publication No. 2002-44051

Non-Patent Literature 1: Shuya Hosokawa, et al. "A Study on Interference Suppression for Wireless OFDM Signals", Proceedings of the Society Conference of IEICE (The Institute of Electronics, Information and Communication Engineers of Japan), B-5-189, 2005 (B-5 Wireless Communications System B (Wireless Access), Communication [1])

SUMMARY OF THE INVENTION

The present invention has an object of providing a wireless receiver which performs channel estimation and interference wave signal detection when a desired wave is a continuous wave such as a digital airwave, thereby having a small reception sensitivity degradation due to noise.

The wireless receiver includes receiving antennas, frequency-space transformers, noise wave removers, a back-end signal processor, a pattern detector, a broadcast interruption detector, and a back-end controller. The antennas receive multicarrier transmission waves. The frequency-space transformers are connected to the corresponding ones of the receiving antennas, and convert signals received by the antennas into frequency-space signals. The noise wave removers are connected to the corresponding ones of the frequency-space transformers, and at least perform the calculation of a transmission line coefficient matrix of the multicarrier transmission waves, and the calculation of an inter-antenna covariance matrix between the antennas on the frequency-space signals obtained by conversion in the frequency-space transformers. The back-end signal processor performs a back-end process on signals related to outputs of the noise wave removers. The pattern detector detects specific data from the signals received by the receiving antennas. The broadcast interruption detector detects the state of interruption of the multicarrier transmission waves. The back-end controller controls the back-end signal processor to operate when the broadcast interruption detector has detected the interruption of the multicarrier transmission waves. The noise wave removers perform the calculation of the inter-antenna covariance matrix when the broadcast interruption detector has detected the interruption of the multicarrier airwaves.

DETAILED DESCRIPTION OF PREFERRED EMBODIMENTS

First Exemplary Embodiment

Figure 1:
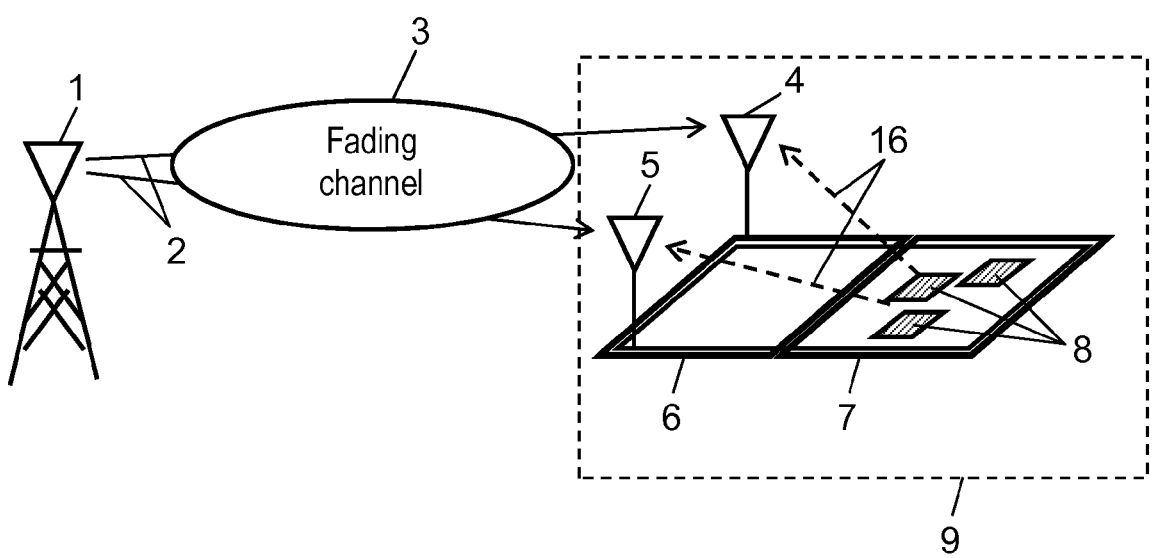
FIG. 1 is a conceptual view of a broadcasting station, a spatial transmission channel, and a wireless receiver according to the present invention.

FIG. 1 is a conceptual view of a broadcasting station, a transmission channel, and a wireless receiver according to a first exemplary embodiment of the present invention. In FIG. 1, broadcasting station 1 transmits multicarrier-OFDM-modulated digital airwaves. Airwaves 2 from broadcasting station 1 are transmitted through fading channel 3. Fading channel 3 is a transmission channel in which airwaves 2 may be reflected or attenuated. Wireless receiver 9 includes receiving antennas 4 and 5, front end 6, and back end 7. Front end 6 mainly performs processes related to wireless reception, and back end 7 mainly performs processes not related to wireless processing. Back end 7 is composed, for example, of digital LSIs 8 for decoding compressed images. Digital LSIs 8 generate noise signals 16 during digital operation. Therefore, if noise signals 16 come in through receiving antennas 4 and 5 prior to front end 6, the reception quality is degraded. The following is a detailed description, with reference to the drawings, of how to cancel unwanted noise signals 16 which can come in through receiving antennas 4 and 5 from inside or near wireless receiver 9, thereby improving the reception quality. The above-mentioned multicarrier-OFDM-modulated digital airwaves are an example of multicarrier transmission waves. In the following description of the present invention, multicarrier-OFDM-modulated digital airwaves are taken as an example of the multicarrier transmission waves.

Figure 3:
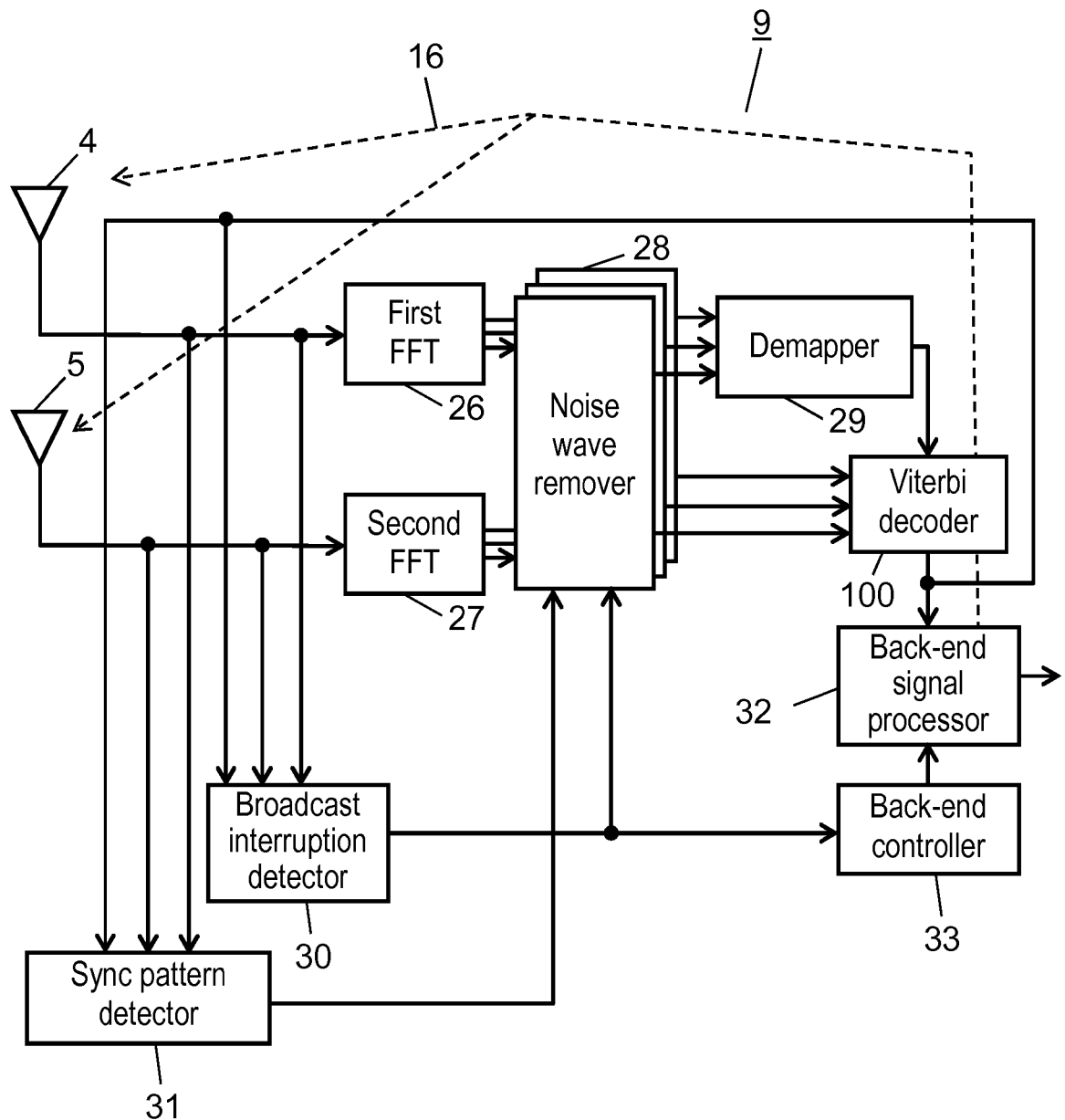
FIG. 3 is a functional block diagram of a wireless receiver according to a first exemplary embodiment of the present invention.

FIG. 3 is a block diagram of the wireless receiver according to the first exemplary embodiment. In FIG. 3, wireless receiver 9 includes receiving antennas 4 and 5, first and second FFTs (frequency-space transformers) 26 and 27, noise wave removers 28, demapper 29, Viterbi decoder 100, back-end signal processor 32, back-end controller 33, broadcast interruption detector 30, and sync pattern detector 31. Receiving antennas 4 and 5 are two of the multiple receiving antennas. In the following description, antennas 4 and 5 are taken as an example of the multiple receiving antennas.

Antenna 4 receives an OFDM signal modulated by a multicarrier transmission wave, and supplies it to first FFT 26. Antenna 5 receives an OFDM signal modulated by a multicarrier transmission wave, and supplies it to second FFT 27. The two FFTs (first and second FFTs 26 and 27) are an example of a frequency-space transformer for Fourier transforming signals received by antennas (individual signals received by antennas 4 and 5) from time-space signals to frequency-space signals. First and second FFT 26 and 27 each output the same number of outputs as the subcarriers that compose the OFDM signals. These outputs are supplied to noise wave removers 28, which are provided for each of the subcarriers. Noise wave removers 28 remove noise signals 16 interfered with signals transmitted from back-end signal processor 32 and then received by antennas 4 and 5. The removal of noise signals 16 is performed from subcarrier to subcarrier. Demapper 29 performs a process opposite to mapping each subcarrier on the signals from which noise has been removed on a per-subcarrier basis. Demapper 29 then sorts data, and outputs it. The output of demapper 29 is supplied to back-end signal processor 32 via Viterbi decoder 100. Processor 32 performs restoring and displaying processes of image and voice, such as system decoding or elementary decoding of compressed AV streams. In other words, back-end signal processor 32 performs processes including decoding of MPEG data. Processor 32 is included in back end 7 shown in FIG. 1.

Broadcast interruption detector 30 detects whether the desired airwave is being transmitted or interrupted, and supplies the detection result to noise wave removers 28 and back-end controller 33. Thus, broadcast interruption detector 30 controls noise wave removers 28, and also controls the operation of back-end signal processor 32 via back-end controller 33. These operations calculate an inter-antenna covariance matrix Ruu indicating the noise correlation between antennas, which will be described later.

Sync pattern detector 31 detects a specific pattern from a continuous wave such as an airwave in order to perform channel estimation of the airwave. Detector 31 then supplies control signals to noise wave removers 28. The control signals are each required to calculate a transmission line coefficient matrix "H" using the specific pattern. Sync pattern detector 31 is an example of a pattern detector for detecting specific data from multicarrier transmission waves received by antennas 4 and 5.

Back-end controller 33 includes a data ROM which performs the same operation as when an airwave is being received. Then, controller 33 controls back-end signal processor 32 to operate in such a manner that noise signals 16 are measured to calculate the inter-antenna covariance matrix Ruu indicating the correlation between the antennas while broadcast interruption detector 30 is outputting a broadcast interruption detection signal. In other words, noise signals 16 are forcibly generated. In the case of digital broadcasting, the above-described operations can be achieved by providing decodable MPEG-2 TS data in the ROM or a similar device.

Figure 2A:
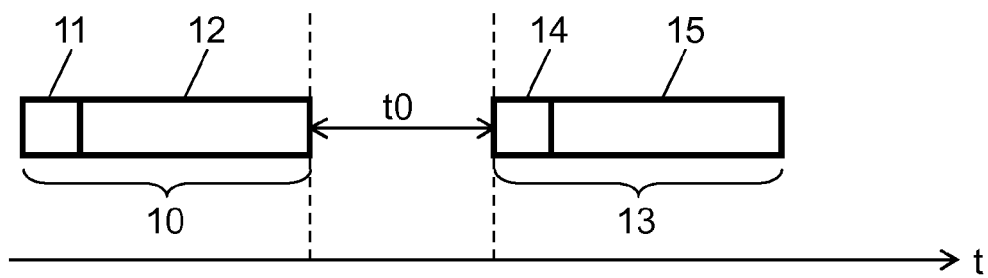
FIG. 2A is a time chart of reception signals.
Figure 2B:
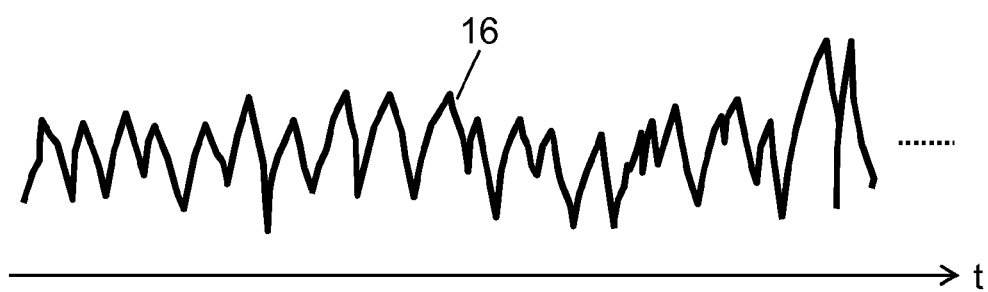
FIG. 2B shows an example of a noise waveform.
Figure 2C:
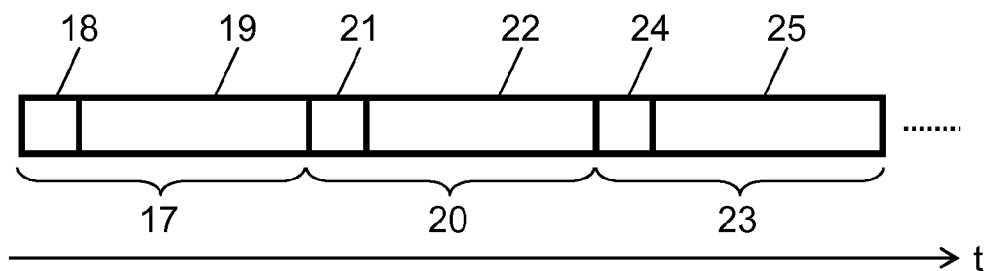
FIG. 2C is a time chart of reception signals.

FIGS. 2A to 2C show the difference between the conventional packet transmission and the continuous wave transmission in the first exemplary embodiment. More specifically, FIG. 2A is a time chart of the conventional packet transmission, in which the horizontal axis represents time "t". Wireless packet 10 consists of preamble 11 and data body 12. Wireless packet 13 consists of preamble 14 and data body 15. Preambles 11 and 14 at the heads of wireless packets 10 and 13 transmit a symbol having a fixed pattern. The channel estimation for packet communication is generally performed using preambles 11 and 14. In packet communication, there is a pause period of time "t0" between adjacent transmission packets, so that disturbing noise signals 16 can be measured in this "t0" period.

FIG. 2B shows one noise signal 16, which is continuously disturbing. Although the noise cannot be separately measured in a period where a packet exists, but can be measured in the period "t0" of FIG. 2A. FIG. 2C is a time chart showing a digital airwave. In FIG. 2C, the horizontal axis represents time "t". MPEG-2 TS packet 17 consists of MPEG-2 TS header 18 and data body 19. Similarly, MPEG-2 TS packet 20 consists of MPEG-2 TS header 21 and data body 22. MPEG-2 TS packet 23 consists of MPEG-2 TS header 24 and data body 25. MPEG-2 TS headers 18, 21, and 24 each contain a sync byte in the specified region. The MPEG-2 TS sync byte is "0x47", which is a fixed value. Therefore, if the sync byte can be detected from the data string, channel estimation can be performed instead of using preamble patterns 11 and 14 of FIG. 2A. The "0x" in "0x47" means hexadecimal, and "0x47" means 47 in hexadecimal notation. The sync-byte detection is performed by a combination of pattern matching and periodicity detection in a general MPEG system decoder. In the case of the continuous wave of FIG. 2C, however, it is difficult to separately measure noise signal 16 of FIG. 2B while on the air because the period "t0" does not exist.

Figure 4:
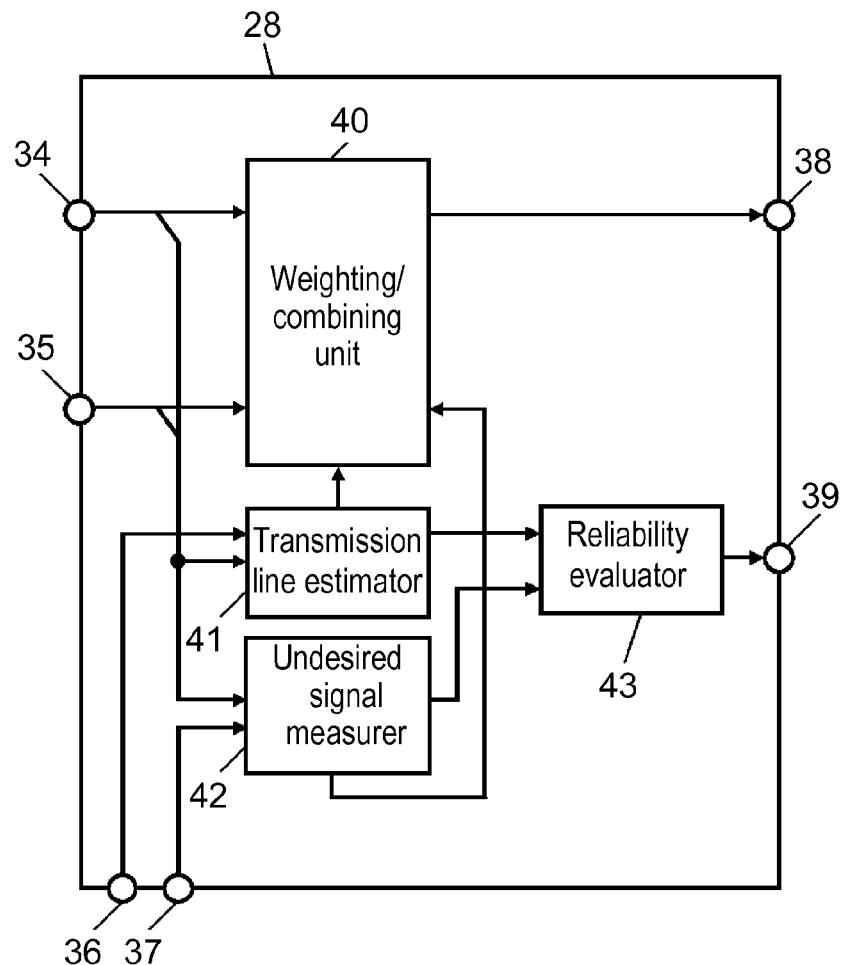
FIG. 4 is a functional block diagram of a noise wave remover in the first exemplary embodiment of the present invention.

The detailed structure and operation of the components shown in FIG. 3 will be described as follows with reference to FIGS. 4 to 8. FIG. 4 is a detailed block diagram of each noise wave remover 28. Noise wave removers 28 each include signal input terminals 34 and 35 connected to first FFT 26 and second FFT 27, respectively, control signal input terminals 36 and 37 connected to sync pattern detector 31 and broadcast interruption detector 30, respectively, and output terminals 38 and 39 connected to demapper 29 and Viterbi decoder 100, respectively. Noise wave removers 28 further each include weighting/combining unit 40, transmission line estimator 41, undesired signal measurer 42, and reliability evaluator 43.

In each noise wave remover 28, transmission line estimator 41 calculates the transmission line coefficient matrix "H" indicating the state of transmission in the fading channel, using the MPEG-2 TS sync byte pattern "0x47". The pattern "0x47" is detected by sync pattern detector 31 mentioned above, and then supplied to transmission line estimator 41 through control signal input terminal 36. Note that the sync byte pattern "0x47" is not the only one that sync pattern detector 31 detects. Detector 31 has only to detect an MPEG synchronous code or an MPEG start code. In other words, sync pattern detector 31, which is a pattern detector, has only to detect an MPEG synchronous code or an MPEG start code.

Figure 5:
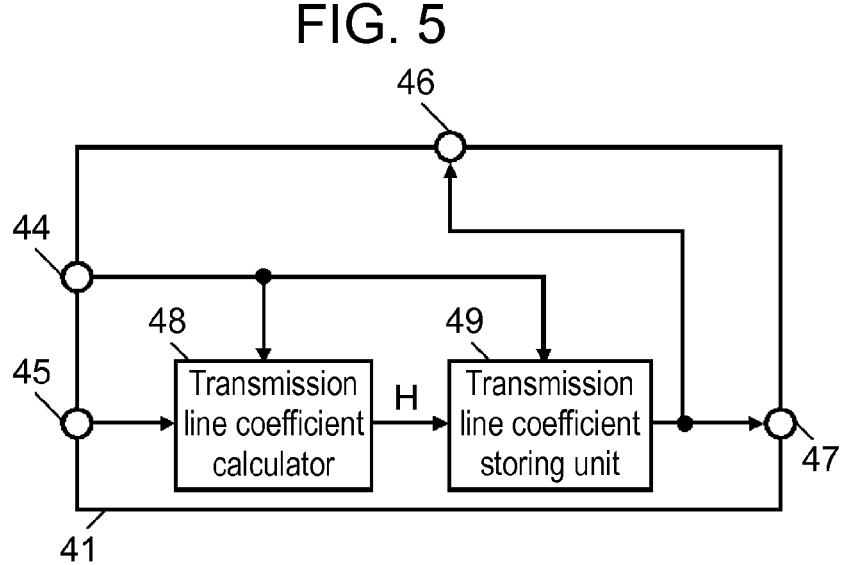
FIG. 5 is a functional block diagram of a transmission line estimator in the first exemplary embodiment of the present invention.

FIG. 5 is a block diagram of transmission line estimator 41. Estimator 41 includes input terminal 44 connected to sync pattern detector 31, input terminal 45 connected to first and second FFTs 26 and 27, and output terminals 46 and 47 connected to weighting/combining unit 40 and reliability evaluator 43, respectively. Estimator 41 further includes transmission line coefficient calculator 48 and transmission line coefficient storing unit 49. Input terminal 44 is connected to input terminal 36 shown in FIG. 4, whereas input terminal 45 is connected to input terminals 34 and 35 shown in FIG. 4. Transmission line coefficient calculator 48 receives the subcarriers after FFT through input terminal 45. Calculator 48 calculates the transmission line coefficient matrix "H" based on the signal corresponding to the sync byte pattern of the subcarriers, using the detection result of sync pattern detector 31. In order to specify the signal corresponding to the sync byte pattern, calculator 48 uses a pattern detection signal received from input terminal 44. The principle of calculating the transmission line coefficient matrix "H" from the signal corresponding to the sync byte pattern is the same as in the corresponding block of the conventional wireless receiver. The transmission line coefficient matrix "H" calculated by transmission line coefficient calculator 48 is supplied to and stored in transmission line coefficient storing unit 49. Unit 49 outputs the value of the transmission line coefficient matrix "H" to the next calculation block (weighting/combining unit 40 or reliability evaluator 43) through output terminals 46 or 47. The timing at which unit 49 stores the transmission line coefficient matrix "H" is when transmission line coefficient calculator 48 has calculated it. Therefore, in order to take synchronization, the sync pattern detection signal supplied from input terminal 44 is also supplied to transmission line coefficient storing unit 49.

Undesired signal measurer 42 determines that the broadcast has been interrupted, based on the output signal of broadcast interruption detector 30, the output signal being received through control signal input terminal 37. Measurer 42 then detects noise signals (hereinafter also referred to as "interference wave signals") u1 and u2 while the airwave is not being transmitted, and also calculates the inter-antenna covariance matrix Ruu by Formula 1 below. The noise signals u1 and u2, which are received by first and second antennas 4 and 5, respectively, are expressed by column vector U.

Formula 1

$$Ruu = E[UU^H] \qquad \text{Mathematical Expression 1}$$

where $U^H$ represents a complex conjugate transposed matrix of the matrix U, and E[ ] represents the time average of [ ]

Figure 6:
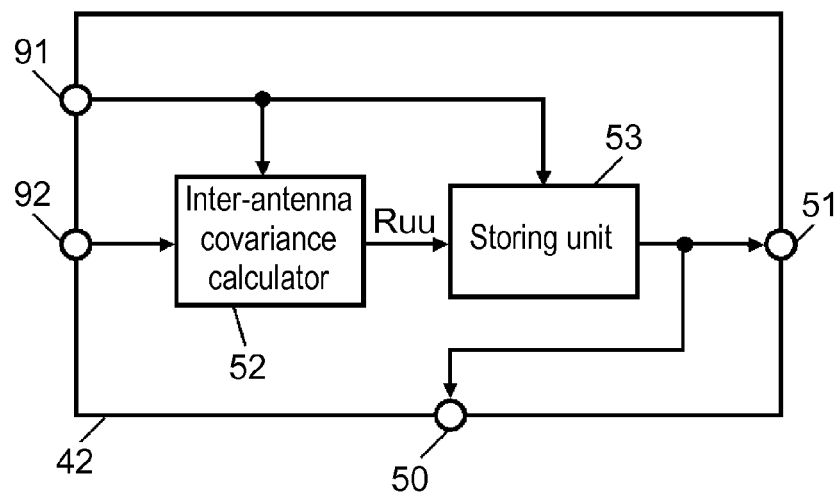
FIG. 6 is a functional block diagram of an undesired signal measurer in the first exemplary embodiment of the present invention.

FIG. 6 is a block diagram of undesired signal measurer 42. As shown in FIG. 6, measurer 42 includes input terminal 91 connected to first and second FFTs 26 and 27, input terminal 92 connected to broadcast interruption detector 30, and output terminals 50 and 51 connected to weighting/combining unit 40 and reliability evaluator 43, respectively. Measurer 42 further includes inter-antenna covariance calculator 52 and storing unit 53. Input terminal 92 is connected to input terminal 37 shown in FIG. 4. The above-mentioned noise signals (interference wave signals) u1 and u2 are supplied from input terminal 92 to inter-antenna covariance calculator 52, which calculates the inter-antenna covariance matrix Ruu by Formula 1. The inter-antenna covariance matrix Ruu is calculated by measuring the noise signals after the airwave is determined to be interrupted. The interruption is determined based on the signal supplied from broadcast interruption detector 30 through input terminal 91. Storing unit 53 stores the inter-antenna covariance matrix Ruu thus calculated, and also outputs it to weighting/combining unit 40 and reliability evaluator 43 through output terminals 50 and 51.

Weighting/combining unit 40 first calculates a weighting coefficient W with which the two input signals are combined. The weighting coefficient W is calculated by Formula 2 for each subcarrier component of the OFDM signals. Formula 2 is derived as follows.

$$r = H \times St + u \qquad \text{Mathematical Expression 1}$$

r: reception signal
H: transmission line coefficient matrix
St: transmission signal
u: undesired signal $$e = s - St = W \times r - St = (W \times H - 1)St + W \times u \qquad \text{Mathematical Expression 2}$$

W: weighting coefficient
s: estimated signal after combination
e: error with the transmission signal
The mean square error is defined as follows:

$$E[e^H e] = (H^H W^H - 1)(W^H - 1) + Ruu W W^H \qquad \text{Mathematical Expression 3}$$

In order to minimize the mean square error, the following equation is partially differentiated with respect to each element of the weighting coefficient W and set to zero:

Formula 2

$$W = H^H (H^H H + Ruu)^{-1} \qquad \text{Mathematical Expression 4}$$

A weighting and combining operation using the weighting coefficient W is performed on the reception signal vector "r"

obtained from the two antennas, thereby calculating a signal vector "s" shown in Formula 3 below.

Formula 3

$$s = W \times r = H^H(H^H H + Ruu)^{-1} \qquad \text{Mathematical Expression 5}$$

Formula 3 indicates combining the two reception signal vectors "r" obtained from the two antennas (antennas 4 and 5) in such a manner as to minimize the mean square error between the signal vector "s" after the weighting and combining, and the transmission signal received from the desired station. The inter-antenna covariance matrix Ruu reflects the inter-antenna correlation component of noise signals 16, thus achieving demodulation with small noise waves. When the noise wave is absent, the inter-antenna covariance matrix Ruu consists only of noise components of the noise waves, and is equivalent to the reception using maximum ratio combining. As a result, in the present invention, it is possible to adaptively reduce the reception errors all the time.

Figure 7:
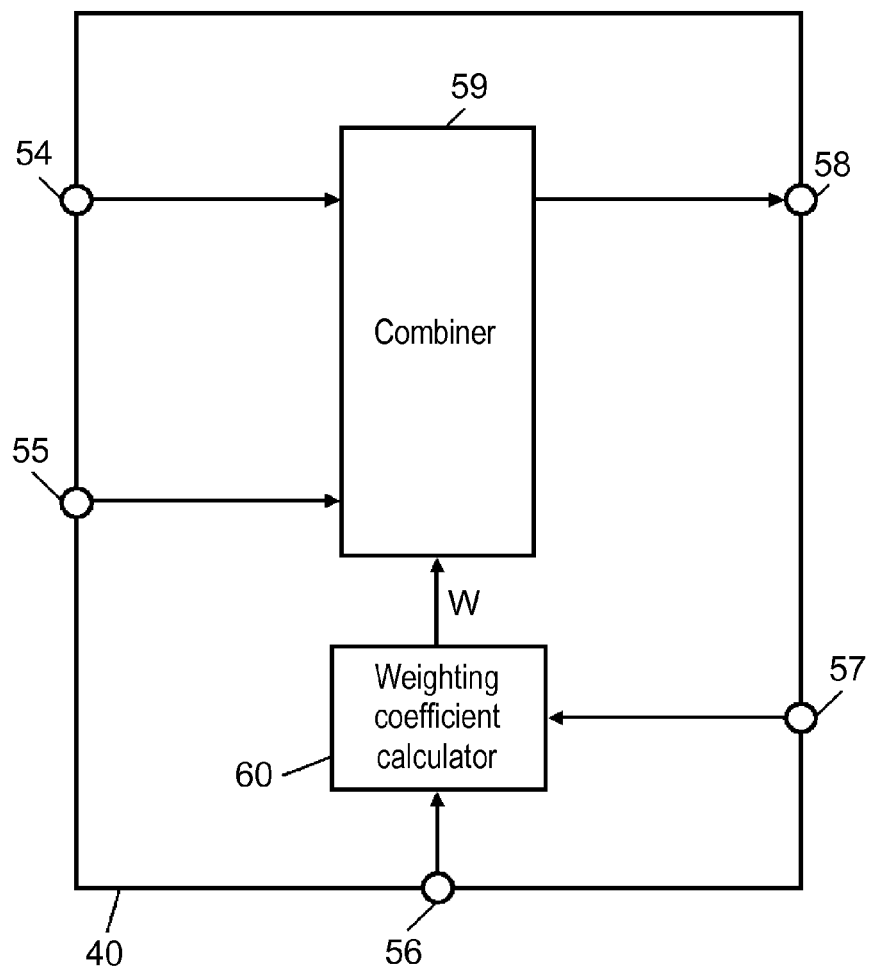
FIG. 7 is a functional block diagram of a weighting/combining unit in the first exemplary embodiment of the present invention.

FIG. 7 is a block diagram of weighting/combining unit 40. Unit 40 includes input terminals 54 and 55 connected to first and second FFTs 26 and 27, respectively, input terminals 56 and 57 connected to transmission line estimator 41 and undesired signal measurer 42, respectively, and output terminal 58 connected to demapper 29. Unit 40 further includes combiner 59 and weighting coefficient calculator 60. Input terminals 54 and 55 are connected to input terminals 34 and 35, respectively, shown in FIG. 4. Output terminal 58 is connected to output terminal 38 shown in FIG. 4. Input terminal 57 is connected to output terminal 50 shown in FIG. 6. The transmission line coefficient matrix "H" supplied from input terminal 56, and the inter-antenna covariance matrix Ruu supplied from input terminal 57 are supplied to weighting coefficient calculator 60. Calculator 60 calculates the weighting coefficient W by Formula 2, and outputs it to combiner 59.

Combiner 59 generates the output signal "s" by combining the reception signal vectors "r" and the weighting coefficient W by Mathematical Expression 3. The vectors "r" are obtained by the frequency-space transformation of the signals received through input terminals 54 and 55 from the two antennas (antennas 4 and 5). The weighting coefficient W is obtained from weighting coefficient calculator 60. The output signal "s" is outputted through output terminal 58 and supplied to demapper 29 by the amount corresponding to each subcarrier.

In FIG. 4, the transmission line coefficient matrices "H" and inter-antenna covariance matrix Ruu are supplied to reliability evaluator 43 as well as to weighting/combining unit 40. Reliability evaluator 43 calculates a likelihood "κ" indicating the likelihood of the signal, and outputs it through output terminal 39.

Figure 19A:
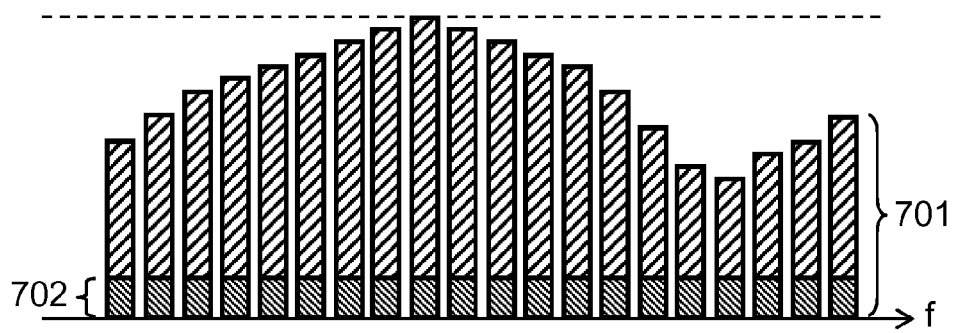
FIG. 19A shows subcarriers and likelihood.
Figure 19B:
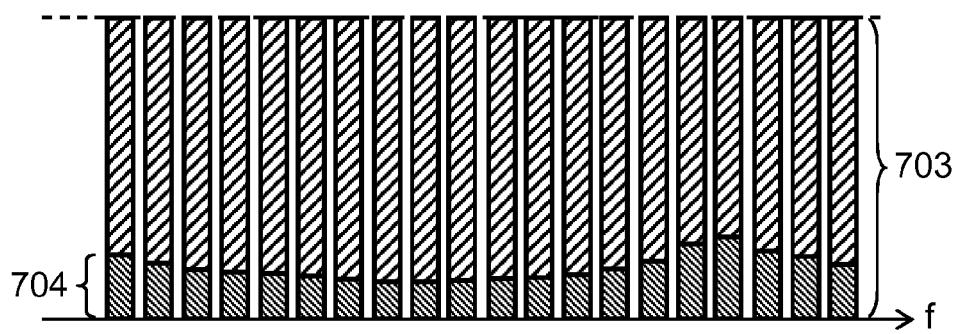
FIG. 19B shows subcarriers and likelihood.
Figure 20:
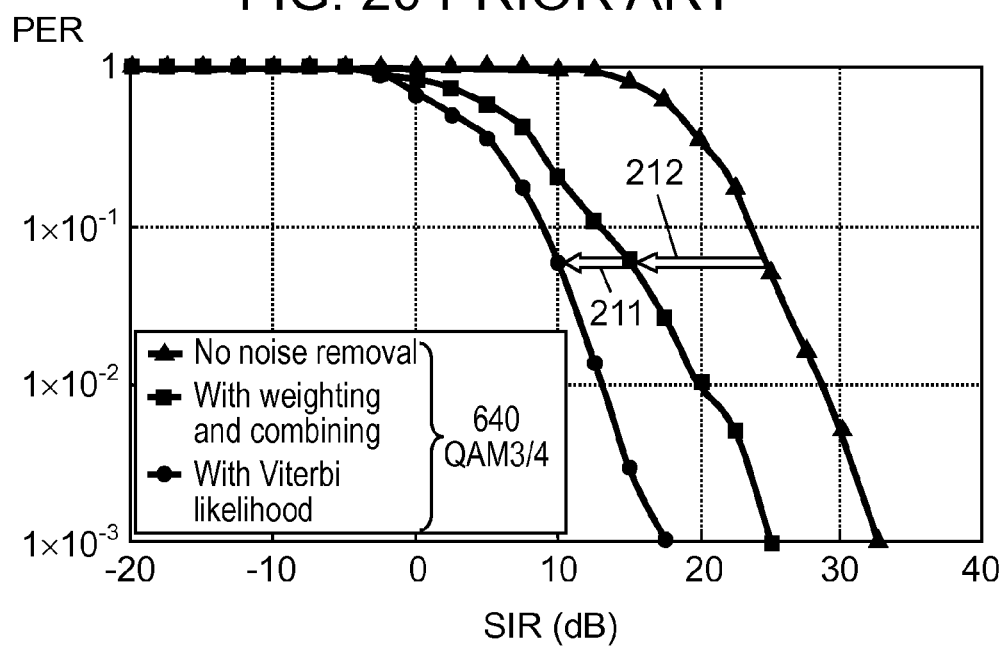
FIG. 20 shows effects of an interference cancellation technique.

As described above, FIG. 19A shows the relation between OFDM subcarrier 701 and noise component 702 before the input signals at the receiving antennas are weighted and combined. FIG. 19B shows OFDM subcarrier 703 and residual error 704 after the input signals are weighted and combined, and then each subcarrier amplitude is normalized. As shown in FIGS. 19A and 19B, noise wave signal 704 remaining after the weighting and combining differs from subcarrier to subcarrier. It is considered that the larger the residual error, the less reliable the subcarrier. For this reason, reliability evaluator 43 calculates, as the likelihood "K" in Formula 5 indicating the likelihood of the signal, the reciprocal of a residual error "e" at the moment when each subcarrier amplitude is normalized after the weighting and combining. The residual error "e" is also referred to a remaining interference wave signal, and is expressed by Formula 4. The residual error "e" and the likelihood "K" are expressed by Formulas 4 and 5, respectively, so that reliability evaluator 43 calculates the likelihood "κ" based on these formulas.

Formula 4

$$e = W \times r - St = W(Hs-u) - St \qquad \text{Mathematical Expression 6}$$

Mathematical Expression 7

$$k = 1 \Big/ ((W^H - 1)(H^H W^H - 1) + WRuuW^H)^{\frac{1}{2}} \qquad \text{Formula 5}$$

Demapper 29 restores the mapping of the per-subcarrier signals outputted from noise wave removers 28, and outputs it. Viterbi decoder 100 performs error correction on the signals having the restored mapping, and outputs demodulated signals.

Figure 8:
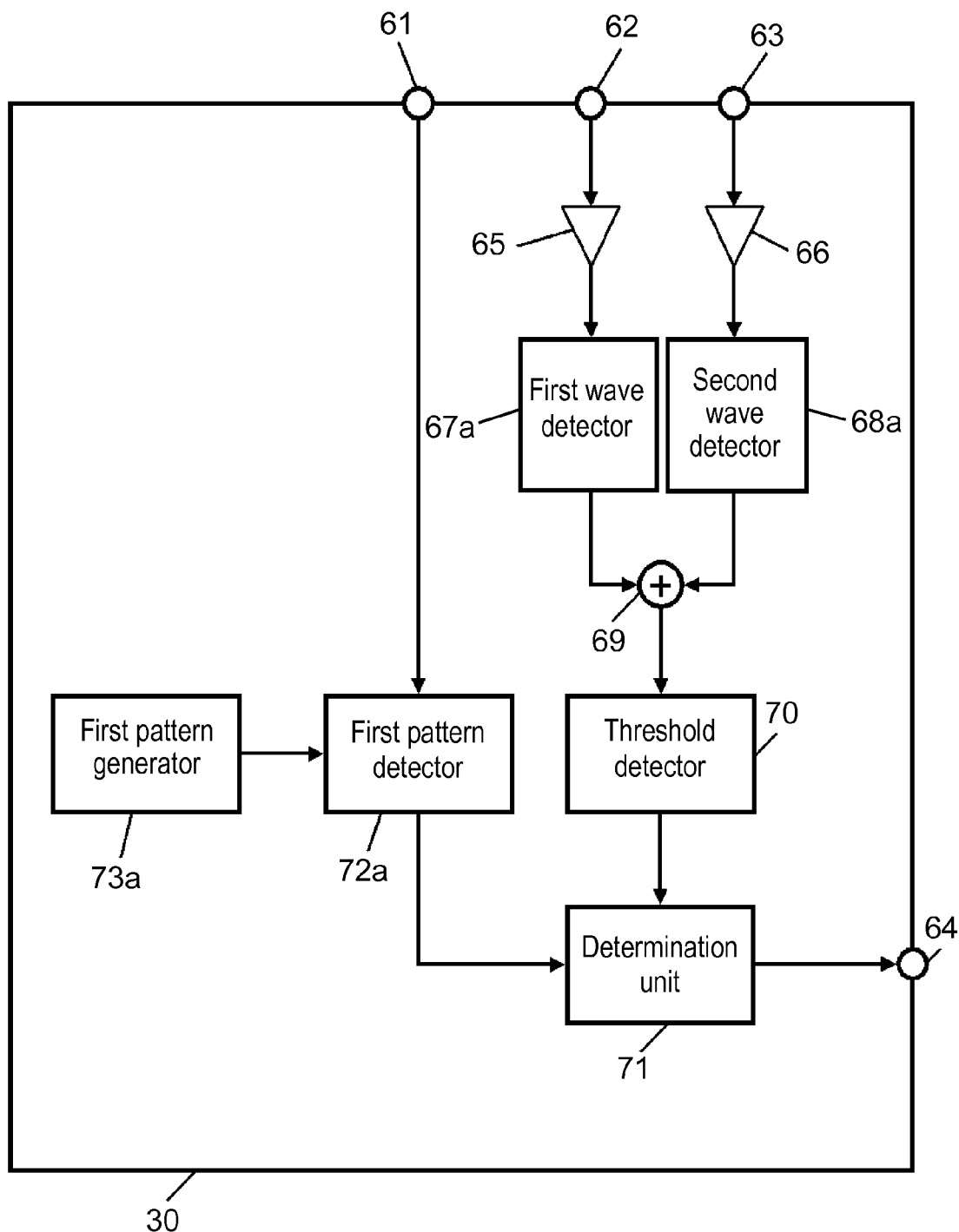
FIG. 8 is a functional block diagram of a broadcast interruption detector in the first exemplary embodiment of the present invention.

FIG. 8 is a block diagram of broadcast interruption detector 30. As shown in FIG. 8, detector 30 includes input terminals 61, 62, and 63 connected to Viterbi decoder 100, receiving antenna 4, and receiving antenna 5, respectively, and output terminal 64 connected to noise wave removers 28 and back-end controller 33. Detector 30 further includes first and second low noise amplifiers 65 and 66, first and second wave detectors 67a and 68a, adder 69, threshold detector 70, determination unit 71, first pattern detector 72a, and first pattern generator 73a. First low noise amplifier 65 amplifies a signal received by antenna 4 through input terminal 62 to a desired amplitude. Second low noise amplifier 66 amplifies a signal received by antenna 5 through input terminal 63 to a desired amplitude. First wave detector 67a detects the output of first low noise amplifier 65, converts it into an electric power signal indicating the strength of the radio wave, and outputs it. Second wave detector 68a detects the output of second low noise amplifier 66, converts it into an electric power signal indicating the strength of the radio wave, and outputs it. The electric power signals outputted by first and second wave detectors 67a and 68a are added to each other by, for example, adder 69. Threshold detector 70 determines the presence of a signal when the output signal of adder 69 is equal to or larger than a predetermined threshold, and then determines whether the signal is being transmitted or interrupted.

Input terminal 61 is provided in order to improve the reliability of the determination by checking, for example, whether the demodulated data is the transmitted data. The checking is performed by a method different from detecting the radio wave and then directly measuring electric power as mentioned above. For example, pattern detector 72 receives the MPEG-2 TS from back-end signal processor 32, and compares it with the MPEG-2 TS pattern. The MPEG-2 TS pattern is stored in first pattern generator 73a, and this pattern can be the above-mentioned sync byte pattern or a system or elementary stream special header pattern. The detection result of first pattern detector 72a is supplied to determination unit 71 together with the result of threshold detector 70. Determination unit 71 performs determination based on a plurality of results, and hence, outputs a highly reliable determination result to output terminal 64.

Figure 9:
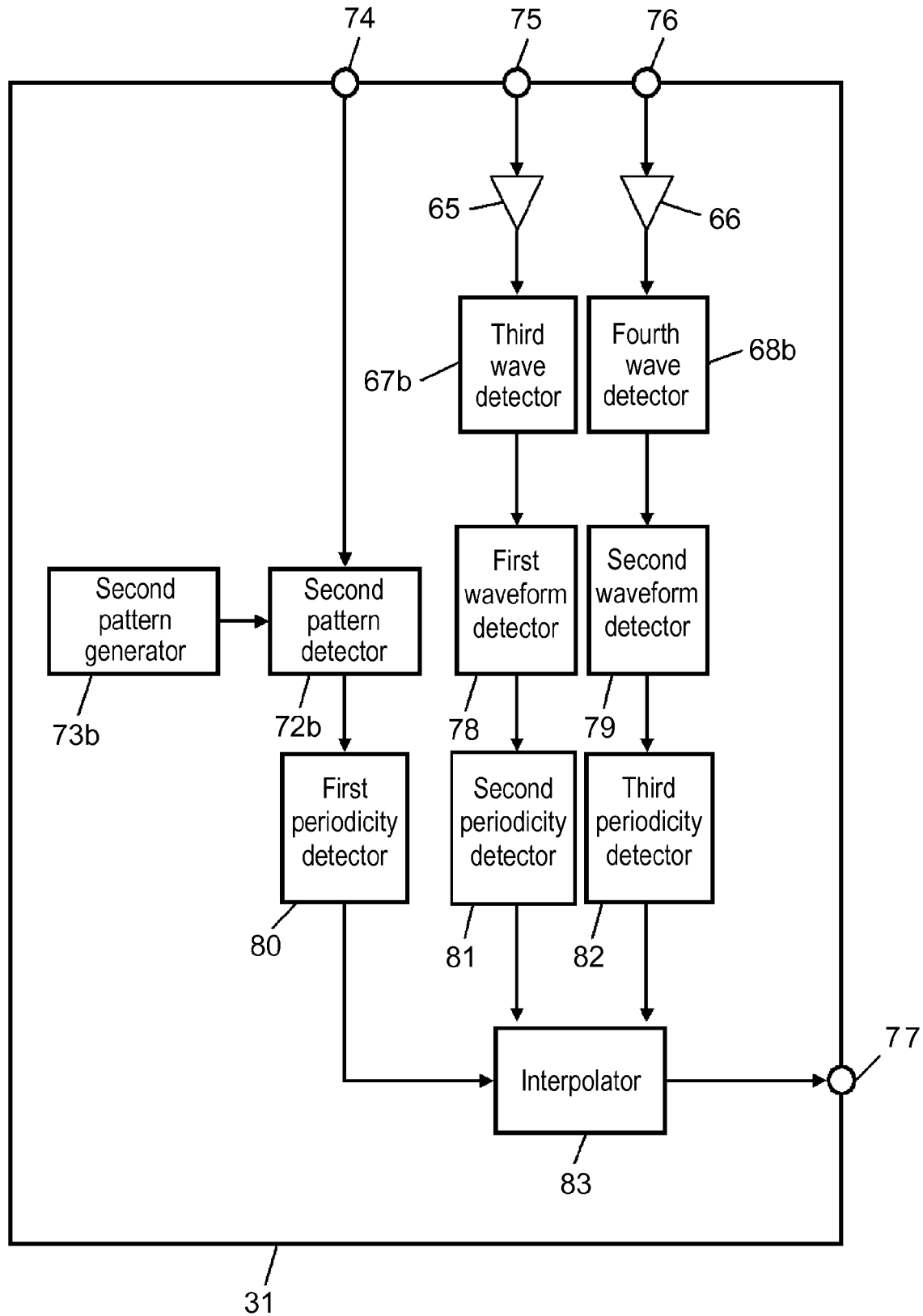
FIG. 9 is a functional block diagram of a sync pattern detector in the first exemplary embodiment to a fourth exemplary embodiment of the present invention.

FIG. 9 is a block diagram of sync pattern detector 31. As shown in FIG. 9, detector 31 includes input terminals 74, 75, and 76 connected to Viterbi decoder 100, antenna 4, and antenna 5, respectively, and output terminal 77 connected to noise wave removers 28. Detector 31 further includes first and second low noise amplifiers 65 and 66, third and fourth wave detectors 67b and 68b, second pattern generator 73b, second pattern detector 72b, first and second waveform detectors 78 and 79, first, second, and third periodicity detectors 80, 81, and 82, and interpolator 83.

The MPEG-2 TS, which is supplied to back-end signal processor 32, is also supplied to second pattern detector 72b through input terminal 74. Detector 72b compares the received MPEG-2 TS sync byte with the pattern "0x47." The pattern "0x47" is stored in second pattern generator 73b. After second pattern detector 72b finishes sync pattern detection, first periodicity detector 80 confirms the pattern periodicity, and removes false sync patterns. The system connected to input terminals 75 and 76 directly detects the pattern from the radio wave in order to further improve the accuracy of sync detection. The signal received by antenna 4 through input terminal 75 is supplied to first low noise amplifier 65. Amplifier 65 amplifies the received signal to a desired amplitude, and then outputs it.

The signal received by antenna 5 through input terminal 76 is supplied to second low noise amplifier 66. Amplifier 66 amplifies the received signal to a desired amplitude, and then output it. Third wave detector 67b detects the output signal of first low noise amplifier 65, and outputs the waveform. Fourth wave detector 68b detects the output signal of second low noise amplifier 66, and outputs the waveform. Third and fourth wave detectors 67b and 68b output waveforms, unlike first and second wave detectors 67a and 68a of FIG. 8. Then, first waveform detector 78 detects the waveform outputted from third wave detector 67b. Second waveform detector 79 detects the waveform outputted from fourth wave detector 68b. Second periodicity detector 81 determines the periodicity of the waveform outputted by first waveform detector 78, and supplies the determination result to interpolator 83. Third periodicity detector 82 determines the periodicity of the waveform outputted by second waveform detector 79, and supplies the determination result to interpolator 83. Interpolator 83 determines whether the sync which is supposed to have periodicity is lacking, and when it is lacking, a sync is interpolated to the sync position. Thus, even when sync detection fails, the sync can be outputted without fail.

With this structure, broadcast interruption detector 30 outputs the above-mentioned signal so as to control the operation of noise wave removers 28, and also to control the operation of back-end signal processor 32 via back-end controller 33. Sync pattern detector 31 outputs the above-mentioned signal, and controls the operation of noise wave removers 28.

In wireless receiver 9 thus structured, incoming noise is detected from the back end by operating it while the broadcast is interrupted. The detection of the incoming noise can be achieved by the following means: a means for weighting and combining a plurality of antenna reception signals using the weighting coefficient obtained from the channel estimation and inter-antenna covariance, and a means for performing channel estimation of airwaves using the sync pattern "0x47" and detecting broadcast interruption. This allows the removal of disturbing waves such as continuous airwaves, and particularly noise waves in MPEG-2 TS, which cannot be handled by the conventional techniques. As a result, wireless receiver 9 has high reception sensitivity of digital reception TVs.

Second Exemplary Embodiment

Figure 10:
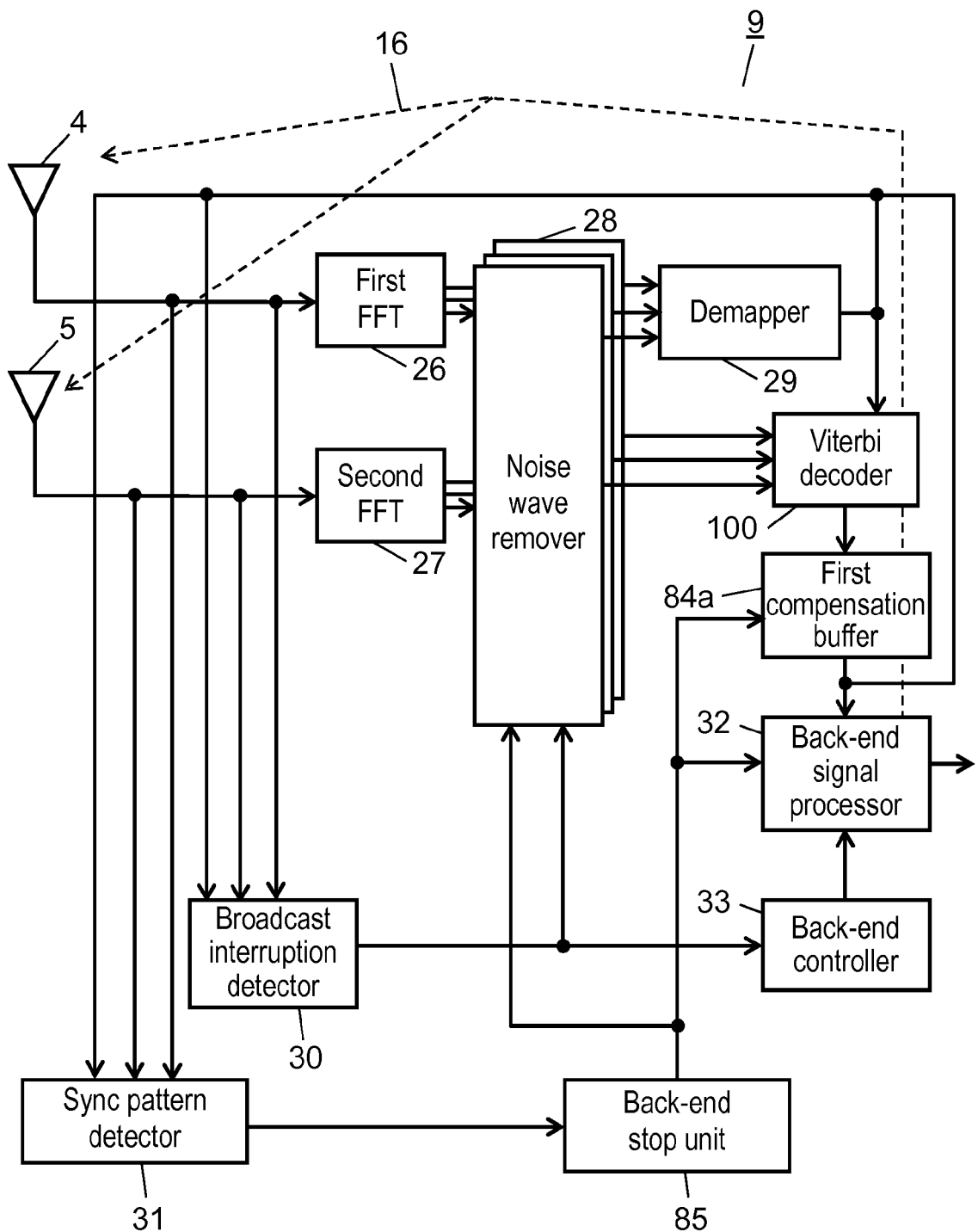
FIG. 10 is a functional block diagram of a wireless receiver according to the second to fourth exemplary embodiments of the present invention.

The following is a description of a wireless receiver according to a second exemplary embodiment of the present invention. FIG. 10 is a block diagram of the wireless receiver, which differs from that of the first exemplary embodiment shown in FIG. 3 only in having first compensation buffer 84a and back-end stop unit 85. Same components are labeled with same reference numerals with respect to the first exemplary embodiment, and the description thereof will be partially omitted. In FIG. 10, first compensation buffer 84a and back-end stop unit 85, which are absent in the first exemplary embodiment, further improve noise elimination performance. Buffer 84a is an example of a compensation buffer which stores received data and supplies it intermittently to a back-end signal processor.

In FIG. 10, antenna 4 receives an OFDM signal modulated by a multicarrier transmission wave, and supplies it to first FFT 26. Antenna 5 receives an OFDM signal modulated by a multicarrier transmission wave, and supplies it to second FFT 27. First and second FFTs 26 and 27 are frequency-space transforming means for Fourier transforming signals received by antennas from time-space signals to frequency-space signals. First and second FFTs 26 and 27 each output the same number of outputs as the subcarriers that compose the OFDM signals. These outputs are supplied to noise wave removers 28, which are provided for each of the subcarriers. Noise wave removers 28 remove noise signals 16 interfered with signals transmitted from back-end signal processor 32 and then received by antennas 4 and 5. The removal of noise signals 16 is performed from subcarrier to subcarrier. Demapper 29 performs a process opposite to mapping each subcarrier on the signals from which noise has been removed on a per-subcarrier basis. Demapper 29 then sorts data, and output it to Viterbi decoder 100. Viterbi decoder 100 performs Viterbi decoding on the received signals, and then once supplies the signals to first compensation buffer 84a. Buffer 84a supplies the received data intermittently to back-end signal processor 32. Processor 32, which performs restoring and displaying processes of image and voice such as system or elementary decoding of compressed AV streams, is designed to process intermittently received data in the present exemplary embodiment.

In order to generate a correct system clock during intermittent data reception, it is necessary that the delay jitter of a packet containing a PCR (Program Clock Reference) is set within the range in which the phase is locked by the clock generation of the system PLL (Phase Locked Loop). Broadcast interruption detector 30 detects whether the desired airwave is being transmitted or interrupted, and outputs the detection result to noise wave removers 28 and back-end controller 33. Detector 30 controls the operation of noise wave removers 28, and also controls the operation of back-end signal processor 32 via back-end controller 33. These operations calculate an inter-antenna covariance matrix Ruu indicating the correlation of noise signals 16 between the antennas, which will be described later.

Sync pattern detector 31 detects a specific pattern from a continuous wave such as an airwave in order to perform channel estimation of the airwave. Detector 31 then supplies the pattern detection results to back-end stop unit 85. Unit 85 periodically stops the operation of back-end signal processor 32, and at the same time, outputs a control timing signal to first compensation buffer 84a, which compensates for the lack of data while the operation is stopped.

Figure 12:
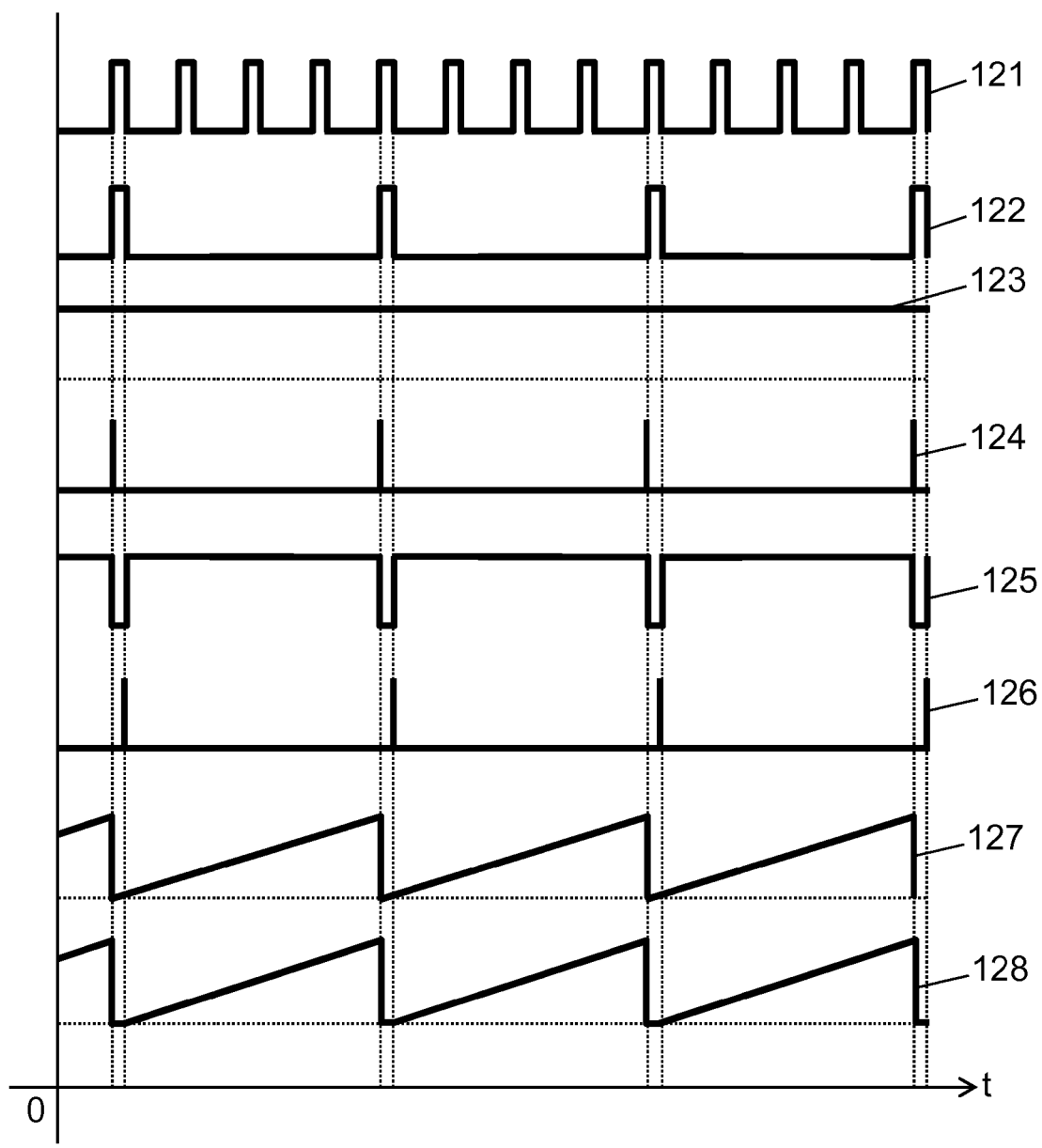
FIG. 12 is a time chart of control signals in the second exemplary embodiment of the present invention.

FIG. 12 is a time chart of control signals for back-end stop unit 85 and the FIFO memory in buffer 84a. Unit 85 periodically reduces the number of pulses in SYNC 121 of FIG. 12, which is the output signal of sync pattern detector 31, thereby generating long-term CTRL 122. Unit 85 then supplies CTRL 122 to noise wave removers 28, back-end signal processor 32, and first compensation buffer 84a.

Figure 11:
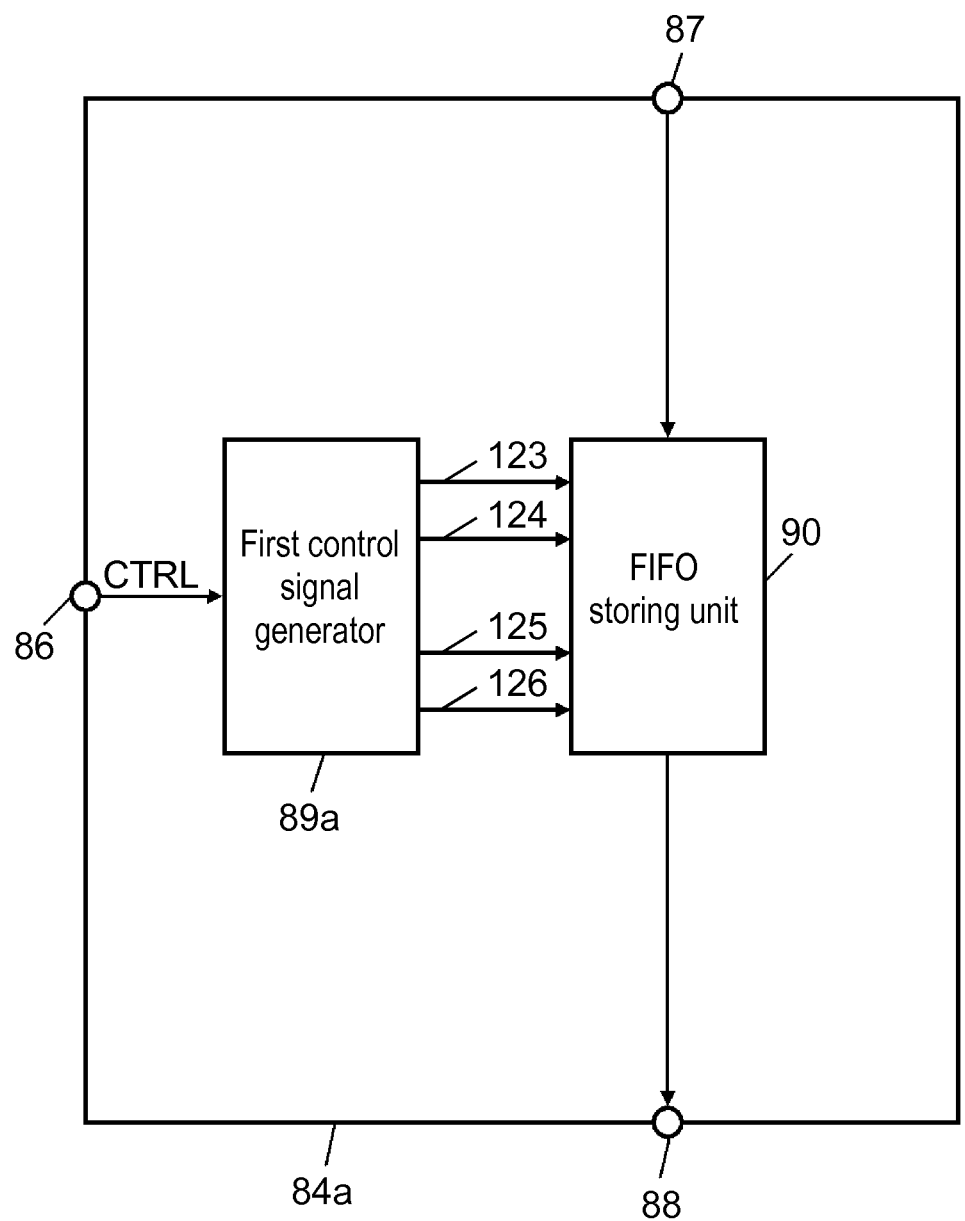
FIG. 11 is a functional block diagram of a first compensation buffer in the second exemplary embodiment of the present invention.

FIG. 11 is a block diagram of first compensation buffer 84a. Buffer 84a includes input terminals 86 and 87 connected to back-end stop unit 85 and Viterbi decoder 100, respectively, and output terminal 88 connected to back-end signal processor 32. Buffer 84a further includes first control signal generator 89a and FIFO storing unit 90. Unit 90 is an example of a storing unit for storing received data.

First control signal generator 89a uses the CTRL signal received from input terminal 86 as a reference signal, which corresponds to CTRL 122 in FIG. 12, and hereinafter referred thereto. Generator 89a also generates, as the control signals of FIFO storing unit 90, the following signals: Write Enable, Write Reset, Read Enable, and Read Reset, which correspond respectively to WEN 123, WRST 124, REN 125, and RRST 126 in FIG. 12, and hereinafter referred thereto.

FIG. 12 shows the timing relation between these signals. More specifically, FIG. 12 shows the signal waveforms of SYNC 121, CTRL 122, WEN 123, WRST 124, REN 125, RRST 126, WP 127, and RP 128. The horizontal axis represents time. WEN 123 is always High (Enable) because the airwave is continuous. WRST 124, which is obtained by time-differentiating the rising edge of CTRL 122, is High (Enable) only at the rising edge of CTRL 122. At this moment, the write pointer of FIFO storing unit 90 is reset. The write pointer is and will be referred to as WP 127. REN 125 is Low (Disenable) only while back-end signal processor 32 at the later stage is suspended. While REN 125 is Low, data readout from FIFO storing unit 90 is inhibited. RRST 126 is High (Enable) only when REN 125 changes from Low (Disenable) to High (Enable). RRST 126 resets RP 128 (the read pointer) of FIFO storing unit 90. This allows the read pointer to be reset later by a predetermined time than the write pointer of FIFO storing unit 90.

In FIG. 12, WP 127 and RP 128 indicate changes in the write pointer and the read pointer, respectively. Both signals have the same periodicity as CTRL 122, but RP 128 rises higher, allowing FIFO readout to be shorter, and hence, faster than WP 127. As a result, data can be read faster than it was written, thus preventing the lack of data in the case of intermittent readout. Back-end signal processor 32 is intermittently operated in such a manner that processor 32 does not operate while the FIFO readout is suspended synchronously with the readout period. While not operating, processor 32 does not generate noise signals 16 coming in through the antennas therefrom. As a result, the channel estimation of the airwave can be performed with high accuracy.

In wireless receiver 9 thus structured, incoming noise can be detected from the back end by operating it while the broadcast is interrupted. The detection of the incoming noise can be achieved by the following means: a means for weighting and combining a plurality of antenna reception signals using the weighting coefficient obtained from the channel estimation and inter-antenna covariance, and a means for performing channel estimation of airwaves using the sync pattern "0x47" and detecting broadcast interruption. This allows the removal of disturbing waves such as continuous airwaves, and particularly noise waves in MPEG-2 TS, which cannot be handled by the conventional techniques. As a result, wireless receiver 9 has high reception sensitivity of digital reception TVs. Furthermore, the intermittent operation of the back end allows the channel estimation of airwaves without noise effect, providing wireless receiver 9 with high channel estimation accuracy and high noise elimination performance.

Third Exemplary Embodiment

The following is a description of a wireless receiver according to a third exemplary embodiment of the present invention. The wireless receiver of the present exemplary embodiment differs from that of the second exemplary embodiment only in that first compensation buffer 84a has been replaced by second compensation buffer 84b having a means for removing PCR jitter. The same components as those in the second exemplary embodiment will not be described in detail. The following description will be focused on the operation of buffer 84b because it differs from the operation of buffer 84a of the second exemplary embodiment. Buffer 84b is an example of a compensation buffer for storing received data and intermittently supplying it to the back-end signal processor.

Figure 13:
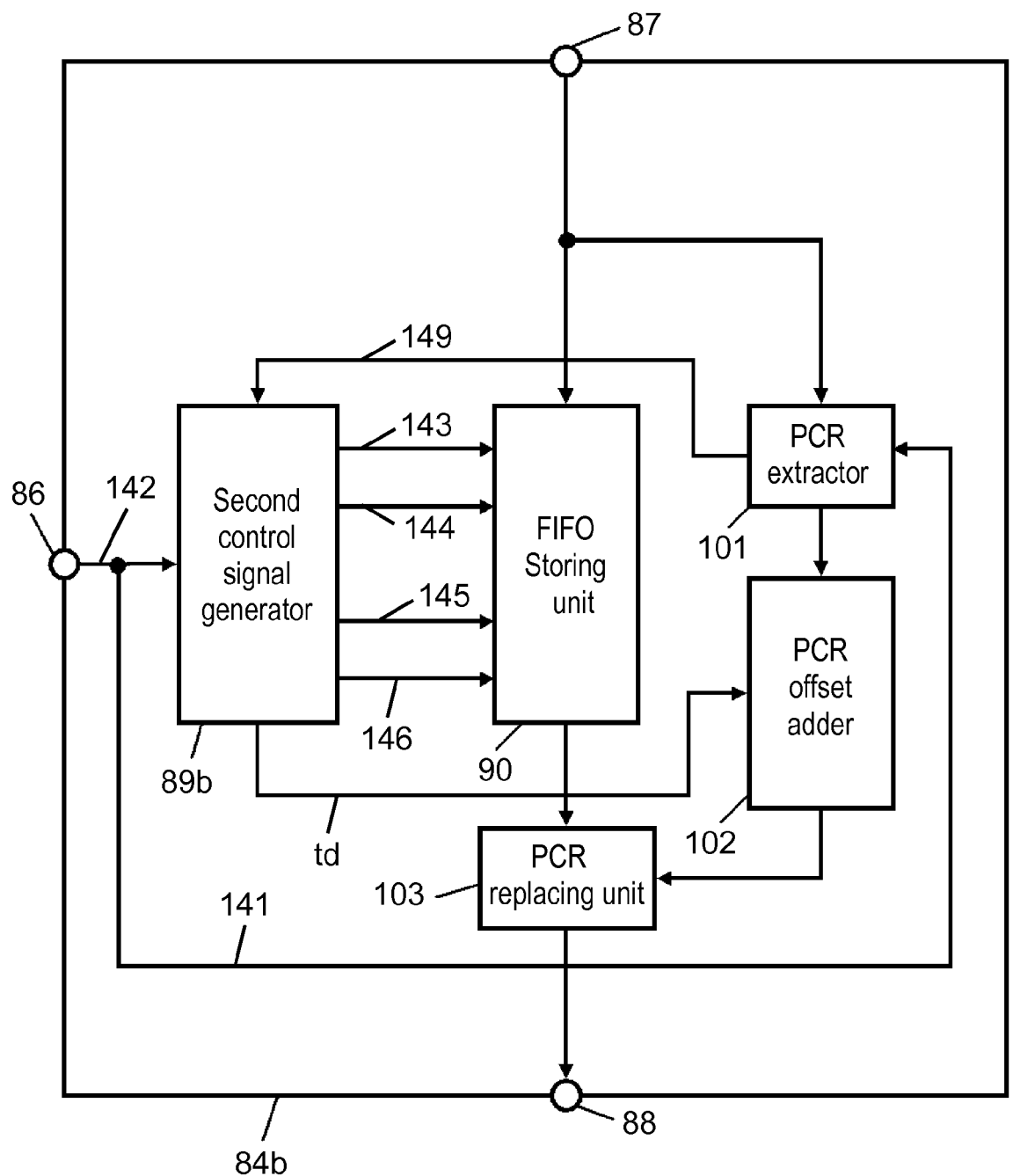
FIG. 13 is a functional block diagram of a second compensation buffer in the third exemplary embodiment of the present invention.

FIG. 13 is a block diagram of buffer 84b in the present exemplary embodiment. As shown in FIG. 13, buffer 84b includes input terminals 86 and 87 connected respectively to back-end stop unit 85 and Viterbi decoder 100, and output terminal 88 connected to back-end signal processor 32. Buffer 84b further includes second control signal generator 89b, FIFO storing unit 90, PCR extractor 101, PCR offset adder 102, and PCR replacing unit 103.

Figure 14:
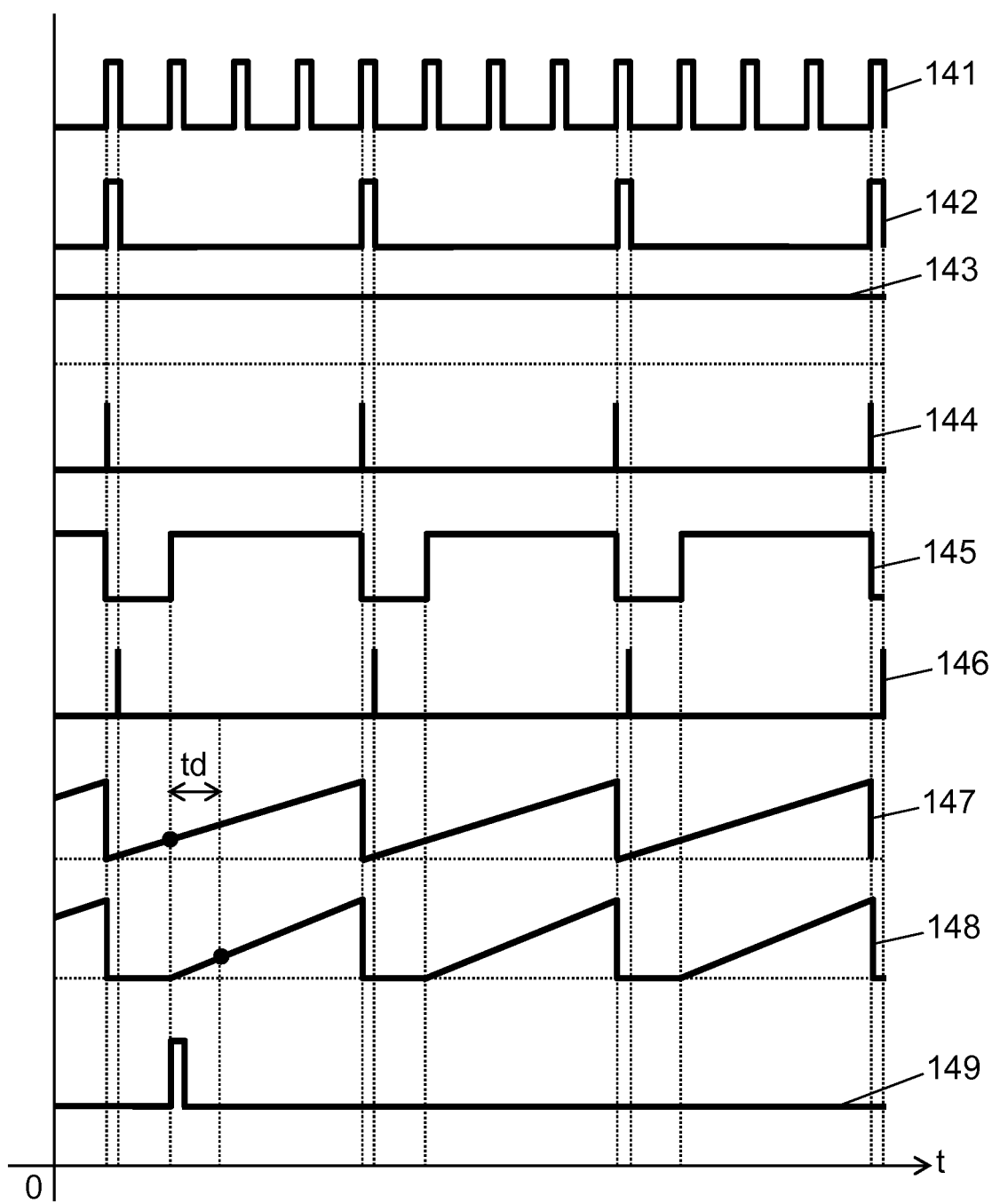
FIG. 14 is a time chart of control signals in the third exemplary embodiment of the present invention.

FIG. 14 is a time chart of control signals for back-end stop unit 85, FIFO storing unit 90 in buffer 84b, and of a pulse from which a PCR has been detected by PCR extractor 101. More specifically, FIG. 14 shows the signal waveforms of SYNC 141, CTRL 142, WEN 143, WRST 144, REN 145, RRST 146, WP 147, RP 148, and PCR 149. The horizontal axis represents time.

Back-end stop unit 85 periodically reduces the number of pulses in SYNC 141 of FIG. 14, which is the output signal of sync pattern detector 31, thereby generating long-term CTRL 142. Unit 85 then supplies SYNC 141 and CTRL 142 to back-end signal processor 32 and second compensation buffer 84b.

In FIG. 13, second control signal generator 89b generates the control signals for FIFO storing unit 90, that is, WEN 143, WRST 144, REN 145, and RRST 146 based on SYNC 141, TRL 142, and PCR 149. SYNC 141 and TRL 142 are received through input terminal 86, and PCR 149 indicates the packet containing a PCR (such as clock information) detected by PCR extractor 101.

FIG. 14 shows the relation of these signals. WEN 143 is always High (Enable) because the airwave is continuous. WRST 144 is obtained by time-differentiating the rising edge of CTRL 142, and becomes High (Enable) only at the rising edge of CTRL 142. At this moment, WP (write pointer) 147 of FIFO storing unit 90 is reset. REN 145 is Low (Disable) only while back-end signal processor 32 at the later stage is suspended. When REN 145 is Low, data readout from FIFO storing unit 90 is inhibited periodically. RRST 146 becomes High (Enable) while REN 145 is Low (Disable). RRST 146 resets RP (read pointer) 148 of FIFO storing unit 90. This allows the read pointer to be reset later by a predetermined time than the write pointer of FIFO storing unit 90.

In FIG. 14, WP 147 and RP 148 indicate changes in the write pointer and the read pointer, respectively. Both signals have the same periodicity as CTRL 142, but RP 148 rises higher, allowing FIFO readout to be shorter, and hence, faster than WP 147. As a result, data can be read from FIFO storing unit 90 faster than it was written, thus preventing the lack of data in the case of periodical readout. The longer REN 145 is Low (Disable), the larger amount of delay jitter of packets is supplied to the back end. Of the packets, packets containing a PCR as reference data used to generate a system clock become unable to generate a correct system clock when the amount of delay jitter is large. To avoid this, in the present exemplary embodiment, packets containing a PCR are detected and the value of the PCR is corrected by the delay time.

In FIG. 13, the data coming through input terminal 87 is supplied to FIFO storing unit 90 and PCR extractor 101 at the same time. PCR extractor 101 detects a packet containing a PCR, and outputs the PCR-detected pulse. The PCR-detected pulse is PCR 149 shown in FIG. 14, and hereinafter referred to as PCR 149. PCR extractor 101 supplies PCR 149 to second control signal generator 89b. Upon receiving PCR 149, generator 89 returns the time "td" shown in FIG. 14 to PCR offset adder 102. The time "td" indicates the time after the packet containing a PCR is written to FIFO storing unit 90 and until it is read out. PCR offset adder 102 adds an offset corresponding to the time "td" to the value of PCR so as to correct the PCR value, and supplies it to PCR replacing unit 103. Unit 103 replaces the original PCR with the PCR supplied from PCR offset adder 102, and then outputs it to output terminal 88. This allows the transmission of a PCR having a correct clock reference. Thus, PCR replacing unit 103 corrects the clock information contained in the data stored in FIFO storing unit 90, which is the storing unit, by the clock information detected by PCR extractor 101.

This structure allows the transmission of a PCR having a correct clock reference, so that the system clock is generated correctly even when the amount of delay jitter is large in FIFO storing unit 90, which guarantees the process of stopping the back end. The correct system clock allows correct operation of back-end signal processor 32 even when back-end signal processor 32 needs to be stopped for a long time by delaying data for a long time in FIFO storing unit 90 in order to obtain correct channel estimation. Thus, incoming noise can be detected from the back end by operating it while the broadcast is interrupted. The detection of the incoming noise can be achieved by the following means: a means for weighting and combining a plurality of antenna reception signals using the weighting coefficient obtained from the channel estimation and the inter-antenna covariance, and a means for performing channel estimation of airwaves using the sync pattern "0x47" and detecting broadcast interruption. This allows the removal of disturbing waves such as continuous airwaves, and particularly noise waves in MPEG-2 TS, which cannot be handled by the conventional techniques. As a result, wireless receiver 9 has high reception sensitivity of digital reception TVs. Furthermore, the intermittent operation of back-end signal processor 32 allows the channel estimation of airwaves without noise effect, providing wireless receiver 9 with high channel estimation accuracy and high noise elimination performance.

Fourth Exemplary Embodiment

The following is a description of a wireless receiver according to a fourth exemplary embodiment of the present invention. The wireless receiver of the present exemplary embodiment differs from that of the third exemplary embodiment only in having third compensation buffer 84c instead of second compensation buffer 84b. Buffer 84c includes a means for compensating for PCR jitter in addition to the function of first compensation buffer 84a used in the second exemplary embodiment. The same components as those in the third exemplary embodiment will not be described in detail. The following description will be focused on the operation of buffer 84c because it differs from the operation of second compensation buffer 84b of the third exemplary embodiment. Buffer 84c is an example of a compensation buffer for storing received data and intermittently supplying it to the back-end signal processor.

Figure 15:
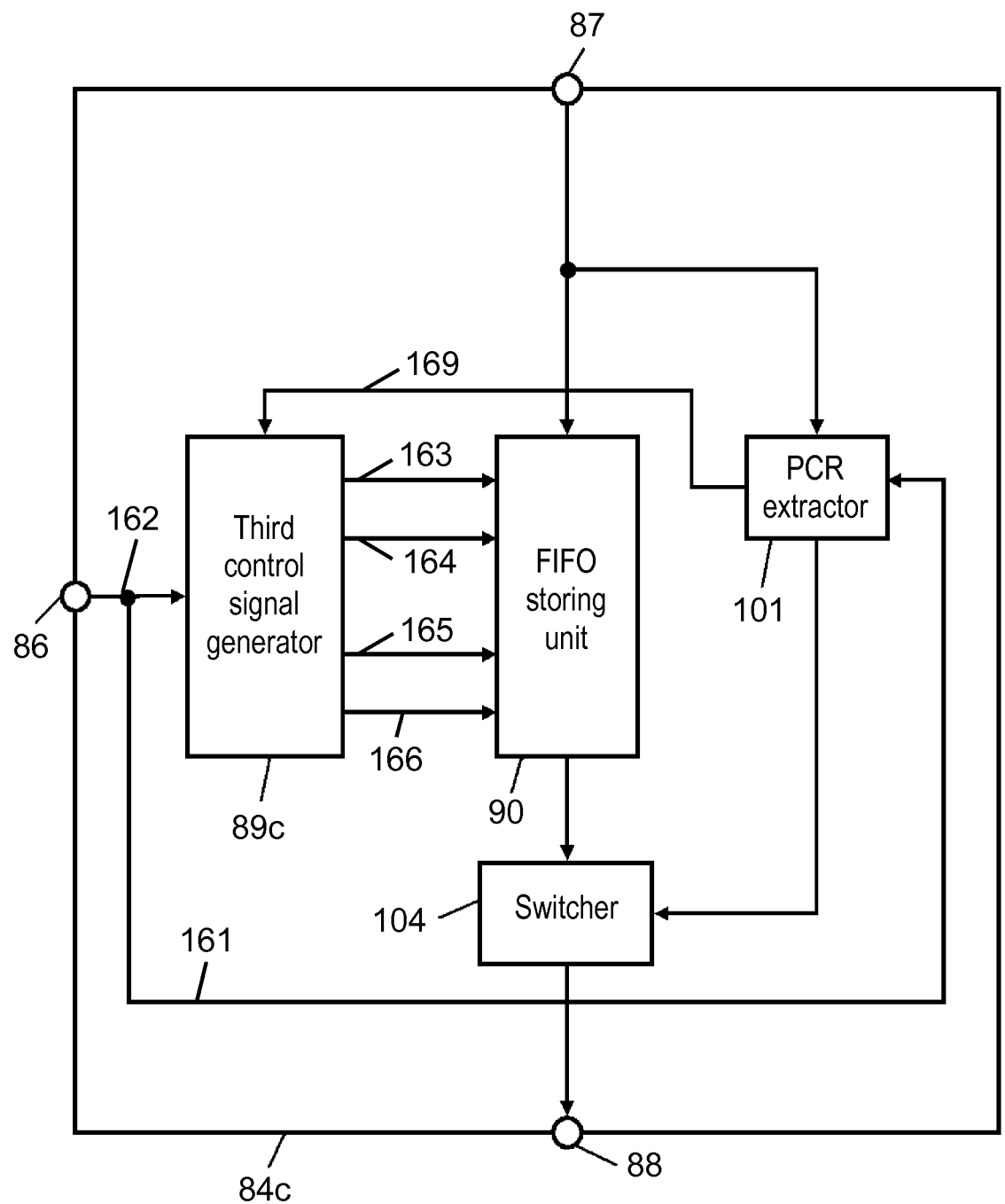
FIG. 15 is a functional block diagram of a third compensation buffer in the fourth exemplary embodiment of the present invention.

FIG. 15 is a block diagram of third compensation buffer 84c in the present exemplary embodiment. As shown in FIG. 15, buffer 84c includes input terminals 86 and 87 connected to back-end stop unit 85 and Viterbi decoder 100, respectively, of FIG. 10, and output terminal 88 connected to back-end signal processor 32. Buffer 84c further includes third control signal generator 89c, FIFO storing unit 90, PCR extractor 101, and switcher 104.

Figure 16:
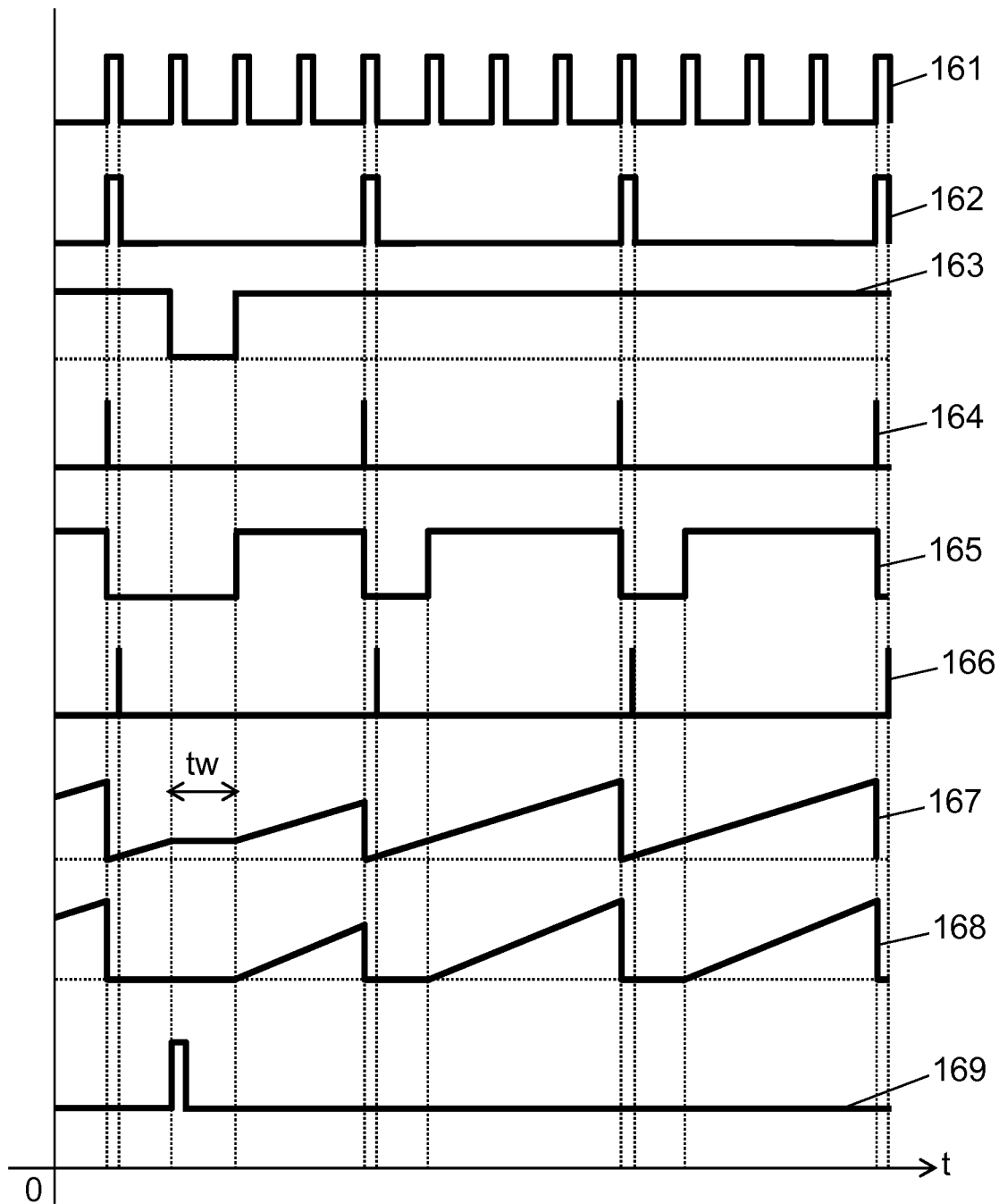
FIG. 16 is a time chart of control signals in the fourth exemplary embodiment of the present invention.
Figure 17:
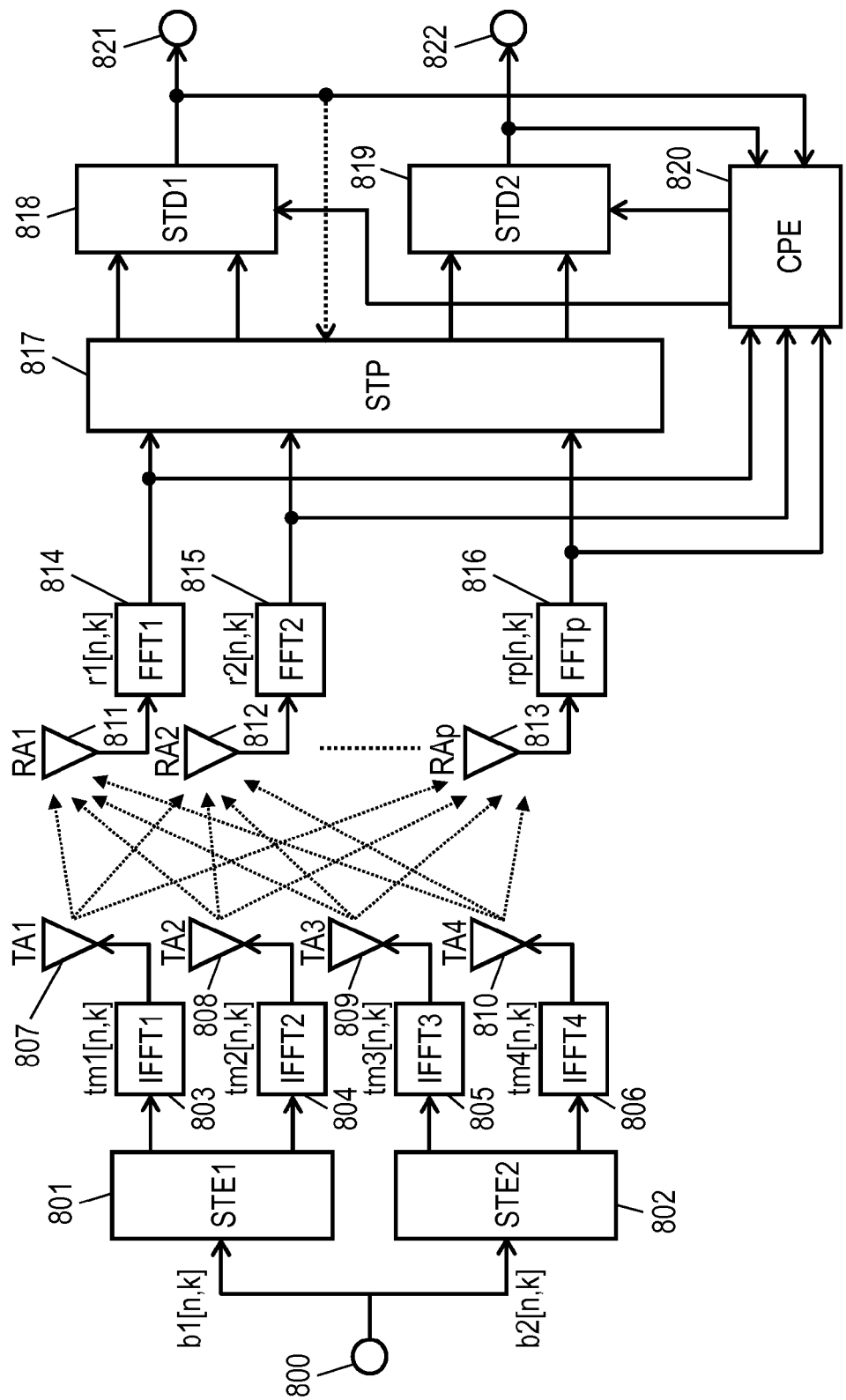
FIG. 17 is a functional block diagram of a conventional wireless receiver and a conventional transmitter.
Figure 18:
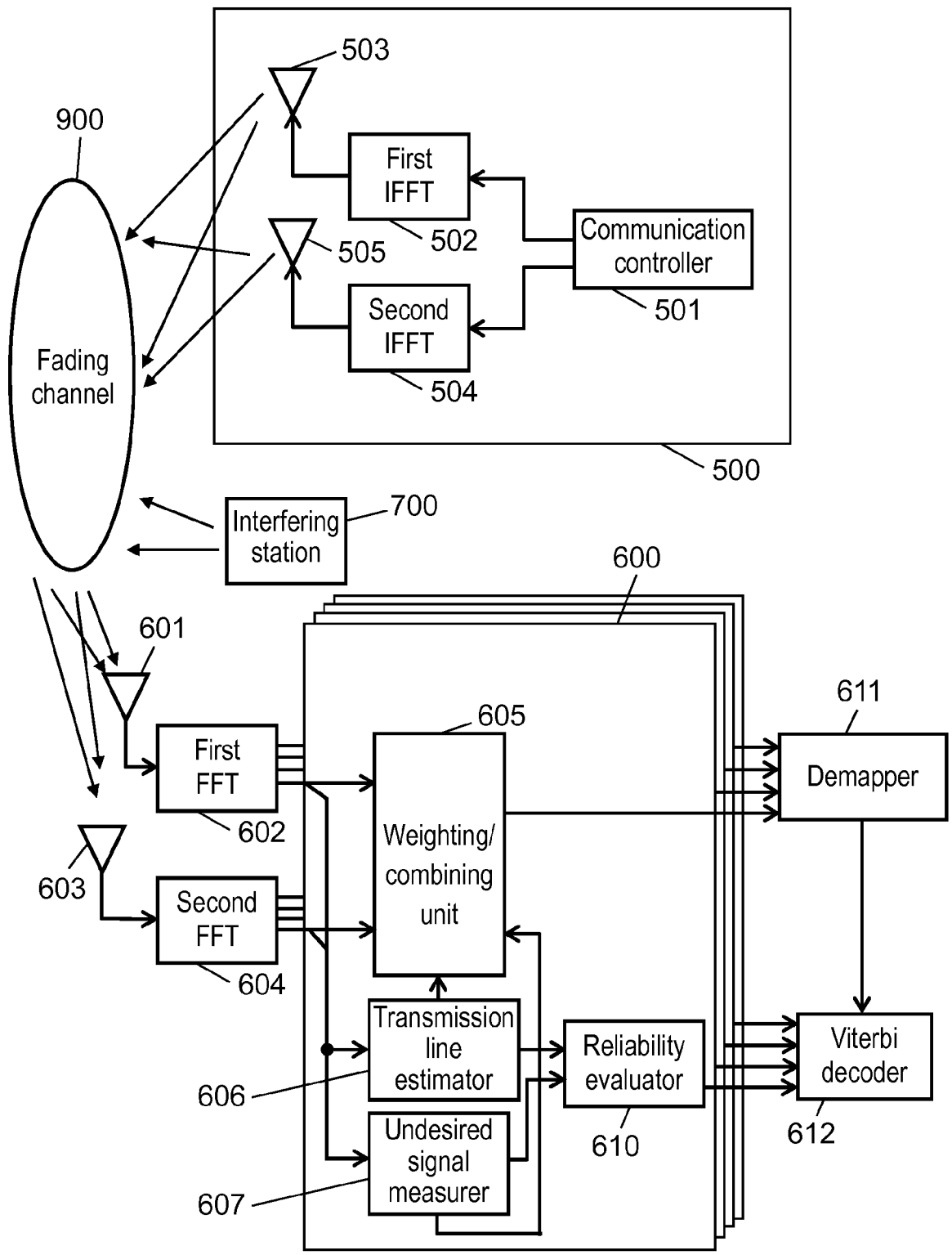
FIG. 18 is a functional block diagram of another conventional wireless receiver and another conventional transmitter.

FIG. 16 is a time chart of control signals for back-end stop unit 85, the FIFO memory in buffer 84c, and a signal from which a PCR has been detected by PCR extractor 101. Unit 85 periodically reduces the number of pulses in SYNC 161 of FIG. 16, which is the output signal of sync pattern detector 31, thereby generating long-term CTRL 162. Unit 85 then supplies SYNC 161 and CTRL 162 to back-end signal processor 32 and third compensation buffer 84c.

In FIG. 15, third control signal generator 89c generates the control signals for FIFO storing unit 90, that is, WEN 163, WRST 164, REN 165, and RRST 166 based on SYNC 161, CTRL 162, and PCR 169. SYNC 161 and CTRL 162 are received through input terminal 86, and PCR 169 indicates the packet containing a PCR detected by PCR extractor 101. FIG. 16 shows the relation of these signals. In order not to store the PCR-containing data to FIFO storing unit 90, WEN 163 becomes and stays Low (Disable) for a predetermined time when generator 89c receives PCR 169 indicating the detection of PCR. As a result, writing to FIFO storing unit 90 is inhibited. WRST 164 is obtained by time-differentiating the rising edge of CTRL 162, and becomes High (Enable) only at the rising edge of CTRL 162. At this moment, WP (write pointer) 167 of FIFO storing unit 90 is reset. REN 165 is Low (Disable) only while back-end signal processor 32 at the later stage is suspended. When REN 165 is Low, data readout from FIFO storing unit 90 is inhibited periodically. In the present exemplary embodiment, however, data is not read from FIFO storing unit 90 while data is not written to FIFO storing unit 90 due to the detection of a PCR. When WEN 163 is Low (Disable), REN 165 is made to be Low (Disable). RRST 166 becomes High (Enable) while REN 165 is Low (Disable). RRST 166 resets RP (read pointer) 168 of FIFO storing unit 90. This allows the read pointer to be reset later by a predetermined time than the write pointer of FIFO storing unit 90.

In FIG. 16, WP 167 and RP 168 indicate changes in the write pointer and the read pointer, respectively. Both signals have the same periodicity as CTRL 162, but RP168 rises higher, allowing FIFO readout to be shorter, and hence, faster than WP 167. As a result, data can be read faster than it was written, thus preventing the lack of data even in the case of periodical readout. However, the longer at least REN 165 is Low (Disable), the larger amount of delay jitter of packets is supplied to back-end signal processor 32. Of the packets, packets containing a PCR as reference data used to generate a system clock become unable to generate a correct system clock when the amount of delay jitter is large. To avoid this, in the present exemplary embodiment, when a packet containing a PCR is detected, only the PCR is outputted in real time directly from third compensation buffer 84c without being stored in FIFO storing unit 90.

In FIG. 15, data coming through input terminal 87 is supplied to FIFO storing unit 90 and PCR extractor 101 at the same time. PCR extractor 101 detects a packet containing a PCR, and supplies a PCR-detected pulse to third control signal generator 89c. PCR-detected pulse corresponds to PCR 169 of FIG. 16. Upon receiving the PCR-detected pulse, third control signal generator 89c sets WEN 163 and REN 165 to Low (Disable), and suspends PCR packets from being written to or read from the FIFO. The time "tw" shown in FIG. 16 is a period in which no data is written. Then, switcher 104 is operated so that PCR extractor 101 outputs the PCR through output terminal 88, thereby transmitting the PCR having a correct clock reference.

This structure allows the transmission of a PCR having a correct clock reference, so that the system clock is generated correctly even when the amount of delay jitter is large in FIFO storing unit 90, which guarantees the process of stopping the back end. The correct system clock allows normal operation of back-end signal processor 32 even when back-end signal processor 32 needs to be stopped for a long time by delaying data for a long time in FIFO storing unit 90 in order to obtain correct channel estimation. Thus, incoming noise can be detected from the back end by operating it while the broadcast is interrupted. The detection of the incoming noise can be achieved by the following means: a means for weighting and combining a plurality of antenna reception signals using the weighting coefficient obtained from the channel estimation and the inter-antenna covariance, and a means for performing channel estimation of airwaves using the sync pattern "0x47" and detecting broadcast interruption. This allows the removal of disturbing waves such as continuous airwaves, and particularly noise waves in MPEG-2 TS, which cannot be handled by the conventional techniques. As a result, wireless receiver 9 has high reception sensitivity of digital reception TVs. Furthermore, the intermittent operation of the back end allows the channel estimation of airwaves without noise effect, providing wireless receiver 9 with high channel estimation accuracy and high noise elimination performance.

The wireless receivers of the first to fourth exemplary embodiments can be applied to broadcast streams other than MPEG-2 TS broadcast streams so that the present invention is not limited to MPEG-2 TS.

In the first to fourth exemplary embodiments, the present invention is described as a wireless receiver, but is not limited thereto. For example, the present invention can be implemented by software (program) on a microcomputer or an integrated circuit for processing signals received by antennas.

As described hereinbefore, the present invention provides a wireless receiver which performs channel estimation of reception and transmission waves, and interference wave signal detection, thereby having a small reception sensitivity degradation.

The wireless receiver of the present invention also performs channel estimation of airwaves without noise effect by intermittently operating the back-end signal processor, thereby having high channel estimation accuracy and high noise elimination performance.

The wireless receiver of the present invention can transmits a PCR having a consistent clock reference in the case when received data contains time information such as MPEG data. This allows the generation of a comparatively reliable system clock even when the back-end signal processor is operated intermittently, and data is held in a compensation buffer means. As a result, the consistent system clock allows normal operation of the back end even when the back end needs to be stopped for a long time by keeping (delaying) data for a long time in the compensation buffer means in order to obtain correct channel estimation.

The wireless receiver of the present invention can transmit a PCR having a correct clock reference. Therefore, it is possible to supply a consistent system clock even when the back-end signal processor is operated intermittently, and data is held in the compensation buffer means.

When a received wave contains an MPEG stream, the wireless receiver of the present invention can detect the pattern by using the data forming the MPEG.

When the wireless receiver of the present invention has a unit for decoding MPEG data (for example, an MPEG decoder), noise generated by the unit can be cancelled.

As described hereinbefore, when the desired wave is a continuous wave such as a digital airwave, the wireless receiver of the present invention performs channel estimation and interference wave signal detection, which cannot be handled by the conventional techniques, thereby having a small reception sensitivity degradation due to noise.

INDUSTRIAL APPLICABILITY

The wireless receiver of the present invention can be used in a wireless transmission-reception system using MPEG-2 TS as a system layer according to channel estimation in which a sync byte pattern unique to MPEG-2 TS is used instead of a packet preamble. Furthermore, a combination of the operation suspension of the signal processor as a noise source and buffer compensation can be applied to a variety of circuits generating device noise. The wireless receiver of the present invention can be applied to any device in order to effectively remove noise generated therein, thereby improving reception sensitivity.

| REFERENCE MARKS IN THE DRAWINGS | |
| --- | --- |
| 4, 5 | receiving antenna |
| 16 | noise signal |
| 26, 27 | FFTs |
| 28 | noise wave remover |
| 29 | demapper |
| 30 | broadcast interruption detector |
| 31 | sync pattern detector |
| 32 | back-end signal processor |
| 33 | back-end controller |
| 40 | weighting/combining unit |
| 41 | transmission line estimator |
| 42 | undesired signal measurer |
| 43 | reliability evaluator |
| 48 | transmission line coefficient calculator |
| 49 | transmission line coefficient storing unit |
| 52 | inter-antenna covariance calculator |
| 53 | storing unit |
| 59 | combiner |
| 60 | weighting coefficient calculator |
| 65 | first low noise amplifier |
| 66 | second low noise amplifier |
| 67a | first wave detector |
| 67b | third wave detector |
| 68a | second wave detector |
| 68b | fourth wave detector |
| 69 | adder |
| 70 | threshold detector |
| 71 | determination unit |
| 72 | pattern detector |
| 73 | pattern generator |
| 78, 79 | waveform detector |
| 80, 81, 82 | periodicity detector |
| 83 | interpolator |
| 84a | first compensation buffer |
| 84b | second compensation buffer |
| 84c | third compensation buffer |
| 85 | back-end stop unit |
| 89 | control signal generator |
| 90 | FIFO storing unit |
| 100 | Viterbi decoder |
| 101 | PCR extractor |
| 102 | PCR offset adder |
| 103 | PCR replacing unit |
| 104 | switcher |

The invention claimed is:

1. A wireless receiver comprising:
a plurality of frequency-space transformers connected to corresponding ones of the receiving antennas, the frequency-space transformers converting signals received for receiving multicarrier transmission waves by the receiving antennas into frequency-space signals;
a plurality of noise wave removers connected to corresponding ones of the frequency-space transformers, the noise wave removers each at least performing:
  calculation of a transmission line coefficient matrix of the multicarrier transmission waves; and
  calculation of an inter-antenna covariance matrix between the receiving antennas on the frequency-space signals obtained by conversion in the frequency-space transformers;
a back-end signal processor for performing a back-end process on signals related to outputs of the noise wave removers;
a broadcast interruption detector for detecting a state of interruption of the multicarrier transmission waves; and
a back-end controller for controlling the back-end signal processor to operate when the broadcast interruption detector has detected the interruption of the multicarrier transmission waves, wherein
the noise wave removers each perform the calculation of the inter-antenna covariance matrix when the broadcast interruption detector has detected the interruption of the multicarrier transmission airwaves.

2. The wireless receiver of claim 1 further comprising:
a pattern detector for detecting specific data from the multicarrier transmission waves received by the receiving antennas,
wherein
the noise wave removers each include:
  a weighting/combining unit for weighting and combining outputs of the receiving antennas;
  a transmission line estimator for receiving the frequency-space signals, and calculating the transmission line coefficient matrix of the multicarrier transmission waves based on the specific data detected; and
  an undesired signal measurer for calculating the inter-antenna covariance matrix.

3. The wireless receiver of claim 2, wherein
the pattern detector detects one of an MPEG synchronous code and an MPEG start code.

4. The wireless receiver of claim 2, wherein
the back-end signal processor performs processes including a decoding process of MPEG data.

5. The wireless receiver of claim 1 further comprising:
a back-end stop unit for stopping a process of the back-end signal processor; and
a compensation buffer for storing received data, and intermittently supplying the received data to the back-end signal processor, wherein
while the back-end stop unit stops the process of the back-end signal processor, the transmission line estimator calculates the transmission line coefficient matrix, and the compensation buffer holds the received data while the back-end stop unit stops the process of the back-end signal processor.

6. The wireless receiver of claim 5, wherein
the compensation buffer includes:
  a PCR (Program Clock Reference) extractor for detecting clock information contained in the received data;
  a PCR (Program Clock Reference) offset adder for adding an offset to the clock information detected by the PCR extractor;
  a storing unit for storing the received data; and
  a PCR (Program Clock Reference) replacing unit for correcting the clock information contained in the received data stored in the storing unit by the clock information detected by the PCR extractor.

7. The wireless receiver of claim 6, wherein
the pattern detector detects one of an MPEG synchronous code and an MPEG start code.

8. The wireless receiver of claim 6, wherein
the back-end signal processor performs processes including a decoding process of MPEG data.

9. The wireless receiver of claim 5, wherein
the compensation buffer includes:
  a storing unit for storing the received data;
  a PCR (Program Clock Reference) extractor for detecting clock information contained in the received data; and
  a switcher for switching clock information contained in the received data stored in the storing unit to the clock information detected by the PCR extractor.

10. The wireless receiver of claim 9, wherein
the pattern detector detects one of an MPEG synchronous code and an MPEG start code.

11. The wireless receiver of claim 9, wherein
the back-end signal processor performs processes including a decoding process of MPEG data.

12. The wireless receiver of claim 5, wherein
the pattern detector detects one of an MPEG synchronous code and an MPEG start code.

13. The wireless receiver of claim 5, wherein
the back-end signal processor performs processes including a decoding process of MPEG data.

14. The wireless receiver of claim 1, wherein
the pattern detector detects one of an MPEG synchronous code and an MPEG start code.

15. The wireless receiver of claim 1, wherein
the back-end signal processor performs processes including a decoding process of MPEG data.

16. An integrated circuit comprising;
a plurality of frequency-space transformers connected to corresponding ones of the receiving antennas, the frequency-space transformers converting signals received for receiving multicarrier transmission waves by the receiving antennas into frequency-space signals;
a plurality of noise wave removers connected to corresponding ones of the frequency-space transformers, the noise wave removers each at least performing:
  calculation of a transmission line coefficient matrix of the multicarrier transmission waves; and
  calculation of an inter-antenna covariance matrix between the receiving antennas on the frequency-space signals obtained by conversion in the frequency-space transformers;
a back-end signal processor for performing a back-end process on signals related to outputs of the noise wave removers;
a broadcast interruption detector for detecting a state of interruption of the multicarrier transmission waves; and
a back-end controller for controlling the back-end signal processor to operate when the broadcast interruption detector has detected the interruption of the multicarrier transmission waves, wherein
the noise wave removers each perform the calculation of the inter-antenna covariance matrix when the broadcast interruption detector has detected the interruption of the multicarrier transmission airwaves.

17. The integrated circuit of claim 16 further comprising:
a pattern detector for detecting specific data from the multicarrier transmission waves received by the receiving antennas,
wherein
the noise wave removers each include:
a weighting/combining unit for weighting and combining outputs of the receiving antennas;
a transmission line estimator for receiving the frequency-space signals, and calculating the transmission line coefficient matrix of the multicarrier transmission waves based on the specific data detected; and
an undesired signal measurer for calculating the inter-antenna covariance matrix.

18. The integrated circuit of claim 16 further comprising:
a back-end stop unit for stopping a process of the back-end signal processor; and
a compensation buffer for storing received data, and intermittently supplying the received data to the back-end signal processor, wherein
while the back-end stop unit stops the process of the back-end signal processor, the transmission line estimator calculates the transmission line coefficient matrix, and
the compensation buffer holds the received data while the back-end stop unit stops the process of the back-end signal processor.

19. The integrated circuit of claim 18, wherein
the compensation buffer includes:
a PCR (Program Clock Reference) extractor for detecting clock information contained in the received data;
a PCR (Program Clock Reference) offset adder for adding an offset to the clock information detected by the PCR extractor;
a storing unit for storing the received data; and
a PCR (Program Clock Reference) replacing unit for correcting the clock information contained in the received data stored in the storing unit by the clock information detected by the PCR extractor.

20. The integrated circuit of claim 18, wherein
the compensation buffer includes:
a storing unit for storing the received data;
a PCR (Program Clock Reference) extractor for detecting clock information contained in the received data; and
a switcher for switching clock information contained in the received data stored in the storing unit to the clock information detected by the PCR extractor.

21. The integrated circuit of claim 16, wherein
the pattern detector detects one of an MPEG synchronous code and an MPEG start code.

22. The integrated circuit of claim 16, wherein
the back-end signal processor performs processes including a decoding process of MPEG data.

* * * * *